(12) United States Patent
Choi et al.

(10) Patent No.: US 12,316,792 B2
(45) Date of Patent: May 27, 2025

(54) ANTENNA STRUCTURE AND ELECTRONIC DEVICE INCLUDING SAME

(71) Applicant: SAMSUNG ELECTRONICS CO., LTD., Suwon-si (KR)

(72) Inventors: Taihwan Choi, Suwon-si (KR); Dokyun Kim, Suwon-si (KR); Jongdoo Kim, Suwon-si (KR); Hyoseok Na, Suwon-si (KR); Kwangseok Ahn, Suwon-si (KR); Wongi Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 508 days.

(21) Appl. No.: 17/866,101

(22) Filed: Jul. 15, 2022

(65) Prior Publication Data
US 2023/0021496 A1     Jan. 26, 2023

Related U.S. Application Data

(63) Continuation of application No. PCT/KR2022/009182, filed on Jun. 28, 2022.

(30) Foreign Application Priority Data

Jul. 20, 2021    (KR) .................... 10-2021-0094997

(51) Int. Cl.
*H04M 1/02* (2006.01)
*H01Q 1/24* (2006.01)

(52) U.S. Cl.
CPC .......... *H04M 1/0237* (2013.01); *H01Q 1/243* (2013.01); *H04M 1/0268* (2013.01)

(58) Field of Classification Search
CPC ... H04M 1/0237; H04M 1/0268; H01Q 1/243
See application file for complete search history.

(56) References Cited

U.S. PATENT DOCUMENTS

| | | |
|---|---|---|
| 10,955,876 B1 | 3/2021 | Song et al. |
| 11,003,219 B1 | 5/2021 | Kim et al. |

(Continued)

FOREIGN PATENT DOCUMENTS

| | | |
|---|---|---|
| KR | 10-2017-0007086 | 1/2017 |
| KR | 10-2017-0027139 | 3/2017 |

(Continued)

OTHER PUBLICATIONS

Written Opinion of ISA dated Oct. 7, 2022 in counterpart WO Application No. PCT/KR2022/009182.

(Continued)

*Primary Examiner* — Justin Y Lee
(74) *Attorney, Agent, or Firm* — NIXON & VANDERHYE, P.C.

(57) ABSTRACT

An electronic device according to various embodiments of the disclosure may include: a first housing including a first conductive portion, a first non-conductive portion, and a first segmented portion extending from the first conductive portion, a second housing configured to accommodate at least a portion of the first housing and to guide a slide movement of the first housing, the second housing including a second conductive portion, and a flexible display including a first area connected to the first housing and a second area extending from the first area and configured to be bendable or rollable, wherein, from a slide-in state to a slide-out state of the first housing with respect to the second housing, the first conductive portion and the second conductive portion may be spaced apart from each other, and in the slide-in state of the first housing with respect to the second housing, at least a portion of the first non-conductive portion may overlap the second conductive portion.

20 Claims, 15 Drawing Sheets

(56) References Cited

U.S. PATENT DOCUMENTS

| | | |
|---|---|---|
| 2017/0364119 A1 | 12/2017 | Lee et al. |
| 2019/0261519 A1 | 8/2019 | Park et al. |
| 2020/0267247 A1 | 8/2020 | Song et al. |
| 2021/0181801 A1* | 6/2021 | Yin ...................... G06F 1/1652 |
| 2021/0219437 A1 | 7/2021 | Kim et al. |
| 2022/0053653 A1 | 2/2022 | Jung et al. |
| 2022/0061175 A1 | 2/2022 | Oh et al. |
| 2024/0080383 A1* | 3/2024 | Song .................... G06F 1/1652 |

FOREIGN PATENT DOCUMENTS

| | | |
|---|---|---|
| KR | 10-2018-0074395 | 7/2018 |
| KR | 10-2019-0101184 | 8/2019 |
| KR | 10-2019-0143029 | 12/2019 |
| KR | 10-2020-0072190 | 6/2020 |
| KR | 10-2259104 | 6/2021 |
| KR | 10-2470945 | 11/2022 |

OTHER PUBLICATIONS

International Search Report dated Oct. 7, 2022 in counterpart WO Application No. PCT/KR2022/009182.
Extended European Search Report dated Oct. 14, 2024 issued in European Patent Application No. 22846067.1.

* cited by examiner

ANTENNA STRUCTURE AND ELECTRONIC DEVICE INCLUDING SAME

CROSS-REFERENCE TO RELATED APPLICATIONS

This application is a continuation of International Application No. PCT/KR2022/009182 designating the United States, filed on Jun. 28, 2022, in the Korean Intellectual Property Receiving Office and claiming priority to Korean Patent Application No. 10-2021-0094997, filed on Jul. 20, 2021, in the Korean Intellectual Property Receiving Office, the disclosures of which are incorporated by reference herein in their entireties.

BACKGROUND

Field

The disclosure relates to an antenna structure and an electronic device including the same.

Description of Related Art

With the development of electronic, information, and communication technologies, various functions are being integrated into one portable communication device or electronic device. For example, a smartphone includes functions of a sound reproduction device, an imaging device, and a digital diary, in addition to a communication function, and further various functions may be implemented in the smartphone through additional installation of applications.

As the use of personal or portable communication devices, such as smartphones, has become common, users' demands for portability and ease of use are increasing. For example, a touch screen display may provide a virtual keypad that replaces a mechanical input device (e.g., a button input device) while serving as an output device that outputs a screen (e.g., visual information). Accordingly, a portable communication device or an electronic device is capable of providing the same or further improved usability (e.g., a larger screen) while being miniaturized. On the other hand, with the commercialization of flexible, for example, foldable or rollable displays, the portability and ease of use of electronic devices are expected to further improve.

In an electronic device including a flexible display expandable by sliding, structures of the electronic device may move (e.g., slide, rotate, or pivot) relative to each other. In this case, some structures (e.g., the first housing and a partial area of the flexible display) may move into or away from another structure (e.g., the second housing), and a radiator portion providing an antenna function of the some structures (e.g., the first housing) and a portion (e.g., the conductive portion) of the other structure (e.g., the second housing) may overlap each other. Coupling between the antenna radiator and the portion (e.g., a metal portion) and/or a change in the coupling area of the antenna radiator due to a relative movement may generate unnecessary capacitance, thereby deteriorating antenna performance.

SUMMARY

Embodiments of the disclosure provide an antenna structure that is capable of providing stable radiation performance by including a segmented portion disposed between an antenna radiator included in a first housing of an electronic device and a portion (e.g., a conductive portion) of a second housing overlapping the antenna radiator.

An electronic device according to various embodiments of the disclosure may include: a first housing including a first conductive portion, a first non-conductive portion, and a first segmented portion extending from the first conductive portion, a second housing configured to accommodate at least a portion of the first housing and to guide a slide movement of the first housing, the second housing including a second conductive portion, and a flexible display including a first area connected to the first housing and a second area extending from the first area and configured to be bendable or rollable, wherein, from a slide-in state to a slide-out state of the first housing with respect to the second housing, the first conductive portion and the second conductive portion may be spaced apart from each other, and in the slide-in state of the first housing with respect to the second housing, at least a portion of the first non-conductive portion may overlap the second conductive portion.

An electronic device according to various example embodiments of the disclosure may include: a first housing including a first conductive portion, a first non-conductive portion, and a first segmented portion extending from the first conductive portion, a second housing configured to accommodate at least a portion of the first housing and to guide a slide movement of the first housing, the second housing including a second conductive portion, and a flexible display including a first area connected to the first housing and a second area extending from the first area and configured to be bendable or rollable, wherein, from a slide-in state to a slide-out state of the first housing with respect to the second housing, the first conductive portion and the second conductive portion may be spaced apart from each other with the first segmented portion interposed therebetween.

In an electronic device according to various embodiments, the relative movements of housings can be stably performed.

In an electronic device according to various embodiments, it is possible to provide an antenna structure that provides stable radiation performance of an antenna radiator designed in a first housing (or a second housing) when the first housing and the second housing perform a relative movement operation.

In an electronic device according to various embodiments, it is possible to provide an antenna structure that is capable of maintaining a resonance characteristic similarly between slide-in and slide-out operations of a first housing and a flexible display with respect to a second housing.

In an electronic device according to various embodiments, a slidable segmented portion is provided between an antenna radiator of a first housing and a second housing so that interference of the antenna radiator can be prevented and/or reduced when the first housing is moved relative to the second housing.

Effects that can be obtained in the disclosure are not limited to those described above, and other effects not described above will be clearly understood by a person skilled in the art to which the disclosure belongs based on the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
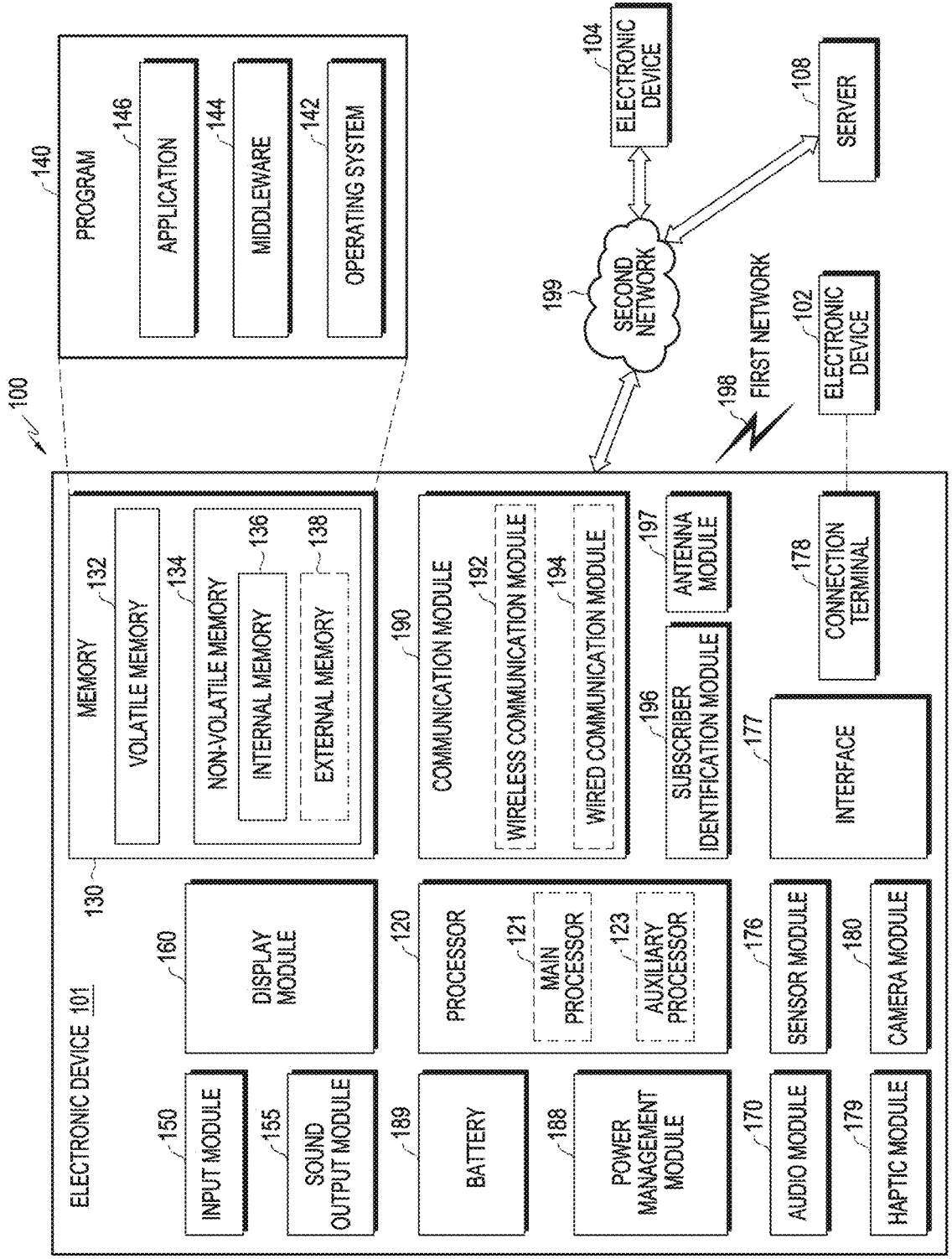
FIG. 1 is a block diagram illustrating an example electronic device in a network environment according to various embodiments.

FIG. 1 is a block diagram illustrating an example electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
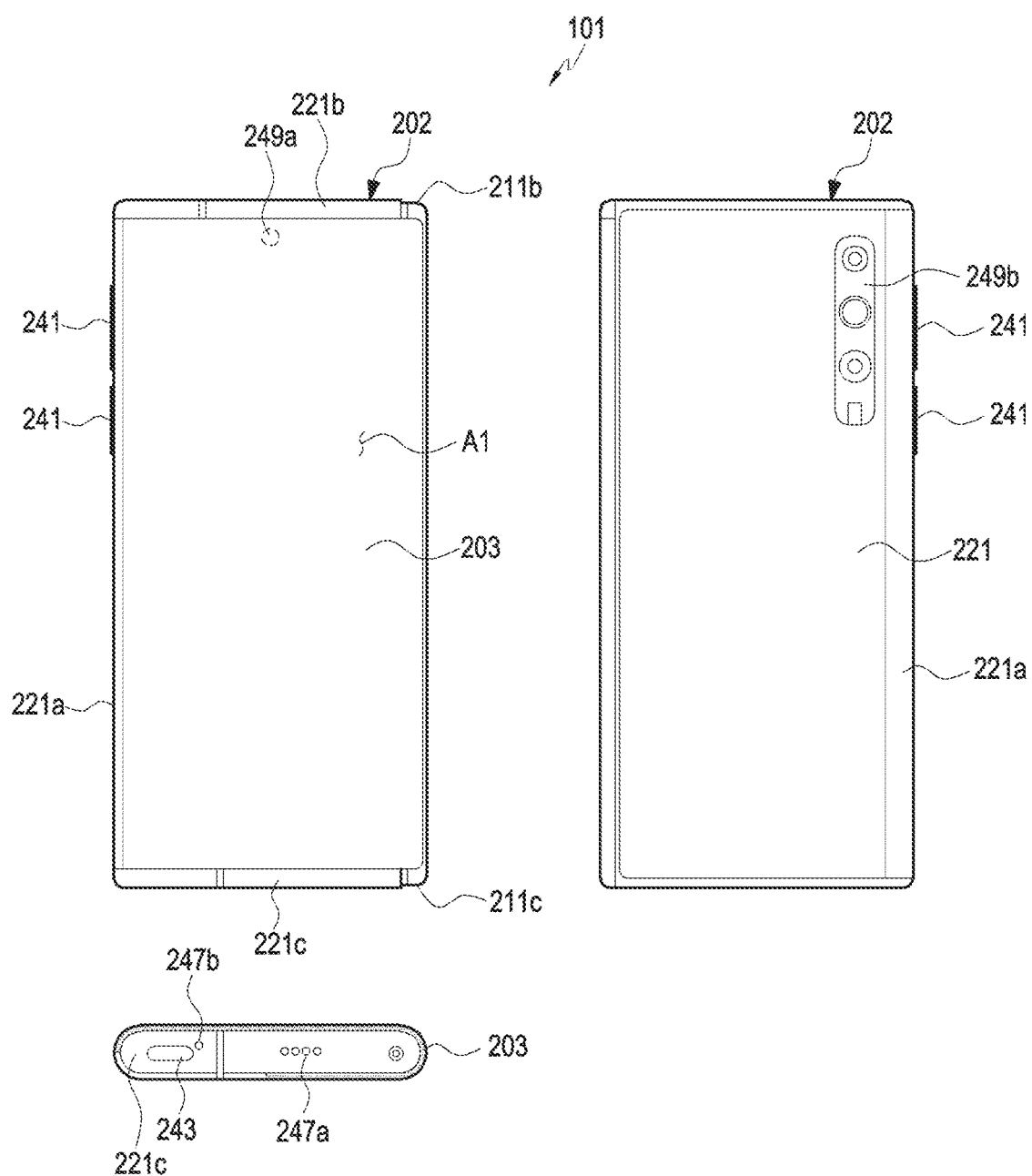
FIG. 2 is a diagram illustrating a state in which a second display area of a flexible display is accommodated in a second housing, according to various embodiments.
Figure 3:
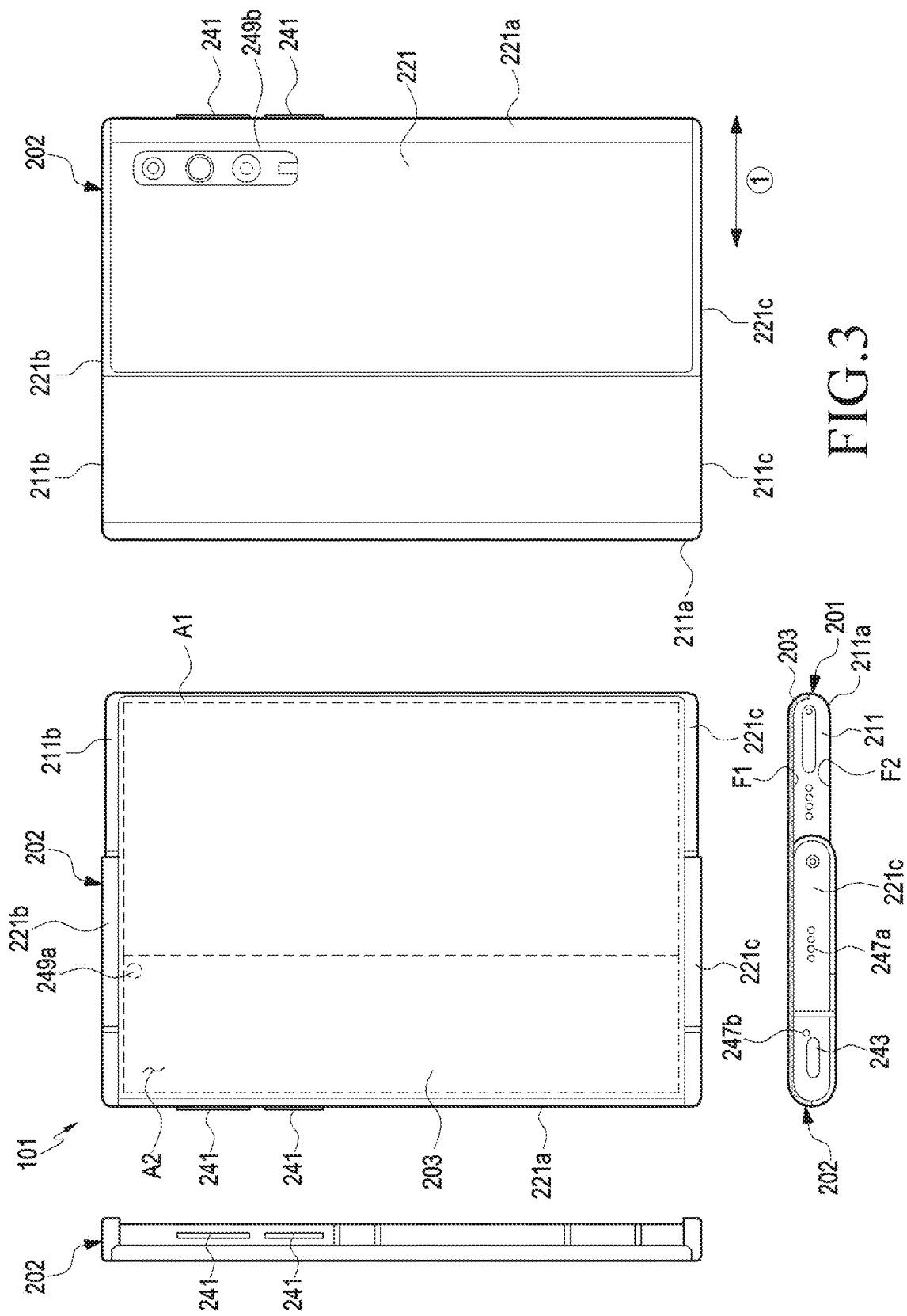
FIG. 3 is a diagram illustrating a state in which the second display area of the flexible display is exposed to the outside of the second housing, according to various embodiments.

FIG. 2 is a diagram illustrating a state in which a second display area of a flexible display is accommodated in a second housing, according to various embodiments. FIG. 3 is a diagram illustrating a state in which the second display area of the flexible display is exposed to the outside of the second housing, according to various embodiments.

The state illustrated in FIG. 2 may be understood as the state in which the first housing 201 is closed relative to the second housing 202, and the state illustrated in FIG. 3 may be understood as the state in which the first housing 201 is opened relative to the second housing 202. According to an embodiment, the "closed state" or the "opened state" may be understood as the state in which the electronic device is closed or the state in which the electronic device is opened.

According to an embodiment, a "slide-in state" or a "slide-out state" may be understood as the state in which the electronic device is closed or the state in which the electronic device is opened.

Referring to FIGS. 2 and 3, an electronic device 101 may include housings 201 and 202. The housings 201 and 202 may include a second housing 202 and a first housing 201 disposed to be movable relative to the second housing 202. In some embodiments, the electronic device 101 may be interpreted as a structure in which the second housing 202 is disposed to be slidable on the first housing 201. According to an embodiment, the first housing 201 may be disposed to be reciprocable by a predetermined distance in the illustrated direction (e.g., the direction indicated by arrow C)) relative to the second housing 202. The configuration of the electronic device 101 of FIGS. 2 and 3 may be wholly or partly the same as or similar to that of the electronic device 101 of FIG. 1.

According to various embodiments, the first housing 201 may be referred to as, for example, a first structure, a slide unit, or a slide housing, and may be disposed to be reciprocable on the second housing 202. According to an embodiment, the first housing 201 may accommodate various electrical and electronic components such as a main circuit board and a battery. The second housing 202 may be referred to as, for example, a second structure, a main unit, or a main housing, and may guide the movement of the first housing 101. A portion of the display 203 (e.g., a first display area A1) may be seated on the first housing 201. According to an embodiment, when the first housing 201 moves (e.g., slides) relative to the second housing 202, another portion of the display 203 (e.g., a second display area A2) may be accommodated inside the second housing 202 (e.g., a slide-in operation) or exposed to the outside of the second housing 202 (e.g., a slide-out operation).

According to various embodiments, the first housing 201 may include a first plate 211 (e.g., a slide plate). The first plate 211 may include a first surface F1 providing at least a portion of the first plate 211 and a second surface F2 facing away from the first surface F1. According to an embodiment, the first plate 211 may support at least a portion of the display 203 (e.g., the first display area A1). According to an embodiment, the first housing 201 may include a first plate 211, a $(1-1)^{th}$ sidewall 211a extending from the first plate 211, a $(1-2)^{th}$ sidewall 211b extending from the $(1-1)^{th}$ sidewall 211a and the first plate 211, and a $(1-3)^{th}$ sidewall 211c extending from the $(1-1)^{th}$ sidewall 211a and the first plate 211 and substantially parallel to the $(1-2)^{th}$ sidewall 211b.

According to various embodiments, the second housing 202 may include a second plate (e.g., the second plate 221 and the main case in FIG. 4), a $(2-1)^{th}$ sidewall 221a extending from the second plate 221, a $(2-2)^{th}$ sidewall 221b extending from the $(2-1)^{th}$ sidewall 221a and the second plate 221, and a $(2-3)^{th}$ sidewall 221c extending from the $(2-1)$ sidewall 221a and the second plate 221 and substantially parallel to the $(2-2)^{th}$ sidewall 221b. According to an embodiment, the $(2-2)^{th}$ sidewall 221b and the $(2-3)^{th}$ sidewall 221c may be configured to be substantially perpendicular to the $(2-1)^{th}$ sidewall 221a. According to an embodiment, the second plate 221, the $(2-1)^{th}$ sidewall 221a, the $(2-2)^{th}$ sidewall 221b, and the $(2-3)^{th}$ sidewall 221c may have a shape opened on one side (e.g., the front surface) to accommodate (or surround) at least a portion of the first housing 201. For example, the first housing 201 may be coupled to the second housing 202 in a state of being at least partially surrounded and may be slidable in a direction parallel to the first surface F1 or the second surface F2 (e.g., the direction indicated by arrow C)) while being guided by the second housing 202. According to an embodiment, the second plate 221, the $(2-1)^{th}$ sidewall 221a, the $(2-2)^{th}$ sidewall 221b, and/or the $(2-3)^{th}$ sidewall 221c may be integrally configured. According to an embodiment, the second plate 221, the $(2-1)^{th}$ sidewall 221a, the $(2-2)^{th}$ sidewall 221b, and/or the $(2-3)^{th}$ sidewall 221c may be configured separately and coupled or assembled to each other.

According to various embodiments, the second plate 221 and/or the $(2-1)^{th}$ sidewall 221a may cover at least a portion of the flexible display 203. For example, at least a portion of the flexible display 203 may be accommodated in the inside of the second housing 202, and the second plate 221 and/or the $(2-1)^{th}$ sidewall 221a may cover a portion of the flexible display 203 accommodated in the inside of the second housing 202.

According to various embodiments, the first hosing 201 may be movable in a first direction (e.g., direction ①) substantially parallel to the $(2-2)^{th}$ sidewall 221b or the $(2-3)^{th}$ sidewall 221c to the opened state or the closed state relative to the second housing 202, and the first housing 201 may be movable to be positioned at a first distance from the $(2-1)^{th}$ sidewall 221a in the closed state and at a second distance, which is greater than the first distance, from the $(2-1)^{th}$ sidewall 221a in the opened state.

According to various embodiments, the electronic device 101 may include a display 203, key input devices 241, a connector hole 243, audio modules 247a and 247b, or camera modules 249a and 249b. Although not illustrated, the electronic device 101 may further include an indicator (e.g., an LED device) or various sensor modules. The configurations of the display 203, the audio modules 247a and 247b, and the camera modules 249a and 249b of FIGS. 2 and 3 may be wholly or partly the same as or similar to those of the display module 160, the audio module 170, and the camera module 180 of FIG. 1.

According to various embodiments, the display 203 may include a first display area A1 and a second display area A2. According to an embodiment, the first display area A1 may be disposed on the first housing 201. For example, the first display area A1 may extend substantially across at least a portion of the first surface F1 and may be disposed on the first surface F1. The second display area A2 may extend from the first display area A1 and may be inserted into or accommodated in the inside of the second housing 202 (e.g., a structure) according to the sliding of the first housing 201, or may be exposed to the outside of the second housing 202.

According to various embodiments, the second display area A2 may move while being substantially guided by a roller (e.g., the curved surface 250 in FIG. 4) mounted on the first housing 201 to be accommodated inside the second housing 202 or in a space defined between the first housing 201 and the second housing 202 or to be exposed to the outside. According to an embodiment, the second display area A2 may be moved based on the slide movement of the first housing 201 in the first direction (e.g., the direction indicated by arrow ①). For example, while the first housing 201 slides, a portion of the second display area A2 may be deformed into a curved shape at a position corresponding to the curved surface 250 of the first housing 201.

According to various embodiments, when viewed from above the first plate 211 (e.g., the slide plate), if the first housing 201 moves from the closed state to the opened state, the second display area A2 may define a substantially flat surface with the first display area A1 while being gradually exposed to the outside of the second housing 202. The display 203 may be coupled to or disposed adjacent to a touch detection circuit, a pressure sensor circuit capable of measuring touch intensity (pressure), and/or a digitizer configured to detect a magnetic-field-type stylus pen. In an embodiment, the second display area A2 may be at least partially accommodated inside the second housing 202, and even in the state (e.g., the closed state) illustrated in FIG. 2, a portion of the second display region A2 may be visually exposed to the outside. According to an embodiment, irrespective of the closed state or the opened state, a portion of the exposed second display area A2 may be positioned on a portion (e.g., the curved surface 250 in FIG. 4) of the first housing, and at a position corresponding to the curved surface 250, a portion of the second display area A2 may maintain the curved shape.

According to various embodiments, the key input devices 241 may be positioned in an area of the first housing 201. Depending on the external appearance and use state, the electronic device 101 may be designed such that the illustrated key input devices 241 are omitted or an additional key input device(s) is(are) included. According to an embodiment, the electronic device 101 may include a key input device (not illustrated), such as a home key button or a touch pad disposed around the home key button. According to an embodiment, at least some of the key input devices 241 may be disposed on the $(2-1)^{th}$ sidewall 221a, the $(2-2)^{th}$ sidewall 221b, or the $(2-3)^{th}$ sidewall 221c of the second housing 202.

According to various embodiments, the connector hole 243 may be omitted according to an embodiment, and may accommodate a connector (e.g., a USB connector) for transmitting and receiving power and/or data to and from an external electronic device. Although not illustrated, the electronic device 101 may include a plurality of connector holes 243, and some of the connector holes 243 may function as connector holes for transmitting and receiving audio signals to and from an external electronic device. In the illustrated embodiment, the connector hole 243 is disposed in the $(2-3)^{th}$ sidewall 221c, but the disclosure is not limited thereto. The connector hole 243 or another connector hole (not illustrated) may be disposed in the $(2-1)^{th}$ sidewall 221a or the $(2-2)^{th}$ sidewall 221b.

According to various embodiments, the audio modules 247a and 247b may include at least one speaker hole 247a or at least one microphone hole 247b. One speaker hole 247a may be provided as a receiver hole for a voice call, and another one may be provided as an external speaker hole. The electronic device 101 may include a microphone configured to acquire sound, and the microphone may acquire sound outside the electronic device 101 through the microphone hole 247b. According to an embodiment, the electronic device 101 may include a plurality of microphones to detect the direction of sound. According to an embodiment, the electronic device 101 may include an audio module in which the speaker hole 247a and the microphone hole 247b are implemented as a single hole, or a speaker in which the speaker hole 247a is excluded (e.g., a piezo speaker).

According to various embodiments, the camera modules 249a and 249b may include a first camera module 249a and a second camera module 249b. The second camera module 249b may be positioned in the first housing 201 and may image a subject in a direction opposite to the first display area A1 of the display 203. The electronic device 101 may include a plurality of camera modules 249a and 249b. For example, the electronic device 101 may include at least one of a wide-angle camera, a telephoto camera, and a close-up camera. According to an embodiment, the electronic device 101 may include an infrared projector and/or an infrared receiver to measure the distance to the subject. The camera modules 249a and 249b may include one or more lenses, image sensors, and/or image signal processors. The first camera module 249a may be disposed to face the same direction as the display 203. For example, the first camera module 249a may be disposed around the first display area A1 or in an area overlapping the display 203, and when disposed in the area overlapping the display 203, the first camera module 249a may image a subject through the display 203.

According to various embodiments, an indicator (not illustrated) of the electronic device 101 may be disposed on the first housing 201 or the second housing 202, and may provide state information of the electronic device 101 as a visual signal by including a light-emitting diode. A sensor module (not illustrated) of the electronic device 101 may generate an electrical signal or a data value corresponding to an internal operating state of the electronic device 101 or an external environmental state. The sensor module may include, for example, a proximity sensor, a fingerprint sensor, or a biometric sensor (e.g., an iris/face recognition sensor or an HRM sensor). In an embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
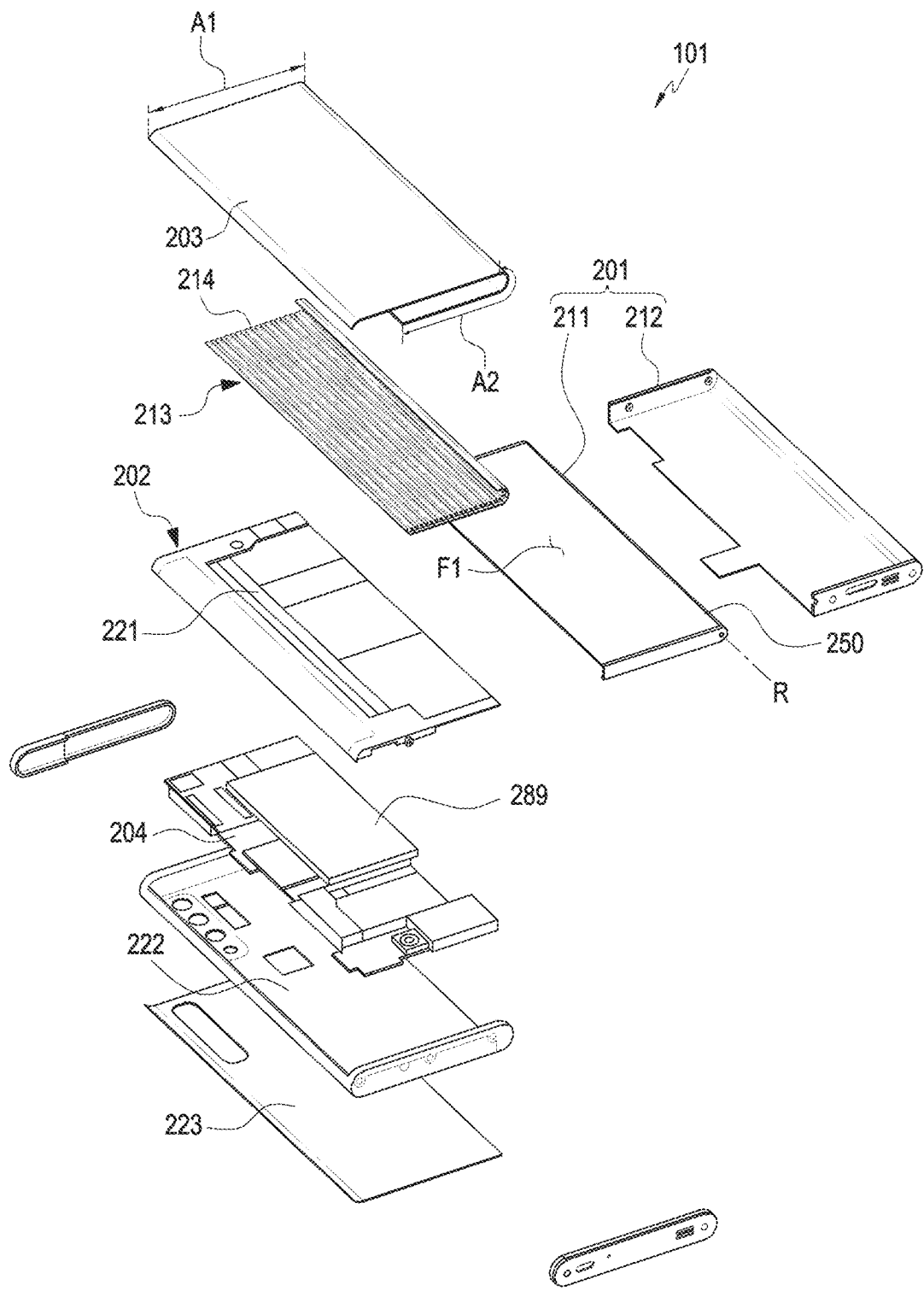
FIG. 4 is an exploded perspective view illustrating the electronic device according to various embodiments.

FIG. 4 is an exploded perspective view illustrating the electronic device according to various embodiments.

Referring to FIG. 4, the electronic device 101 may include a first housing 201, a second housing 202, and a display 203 (e.g., a flexible display, a foldable display, or a rollable display), and an articulated hinge structure 213. A portion of the display 203 (e.g., the second display area A2) may be accommodated in the inside of the electronic device 101 along the curved surface 250 of the first housing 201.

The configurations of the first housing 201, the second housing 202, and the display 203 of FIG. 4 may be wholly or partly the same as or similar to those of the first housing 201, the second housing 202, and the display 203 of FIGS. 2 and 3.

According to various embodiments, the first housing 201 may include a first plate 211 and a slide cover 212. The first plate 211 and the slide cover 212 may be mounted on (e.g., at least partially connected to) the second housing 202, and may linearly reciprocate in a direction (e.g., the direction of the arrow ① in FIG. 1) while being guided by the second housing 202. According to an embodiment, the first plate 211 may include a first surface F1, and the first display region A1 of the display 203 may be substantially mounted on the first surface F1 to be maintained in the form of a flat plate. The slide cover 212 may protect the display 203 positioned on the first plate 211. For example, at least a portion of the display 203 may be positioned between the first plate 211 and the slide cover 212. According to an embodiment, the first plate 211 may be made of a metal material and/or a non-metal (e.g., a polymer) material. According to an embodiment, the first plate 211 may accommodate components of the electronic device 101 (e.g., the battery 289 (e.g., the battery 189 in FIG. 1) or the circuit board 204).

According to various embodiments, the articulated hinge structure 213 may be connected to the first housing 201. For example, the articulated hinge structure 213 may be positioned between the first plate 211 and the slide cover 212. According to an embodiment, when the first housing 201 slides, the articulated hinge structure 213 is movable relative to the second housing 202. In the closed state (e.g., FIG. 2), substantially most of the structure of the articulated hinge structure 213 may be accommodated in the second housing 202. According to an embodiment, at least a portion of the articulated hinge structure 213 may move to correspond to the curved surface 250 positioned at an edge of the first housing 201.

According to various embodiments, the articulated hinge structure 213 may include a plurality of bars or rods 214. The plurality of rods 214 may linearly extend to be disposed substantially parallel to the rotation axis R of the roller 250, and may be arranged in a direction substantially perpendicular to the rotation axis R (e.g., the direction in which the first housing 201 slides).

According to various embodiments, each rod 214 may rotate while maintaining a parallel state with another adjacent rod 214. For example, one of the rods 214 may move while rotating about another adjacent rod around at least a portion of the circumference of the same. According to an embodiment, as the first housing 201 slides, the plurality of rods 214 may be arranged to define a curved shape or may be arranged to define a flat shape. For example, as the first housing 201 slides, a portion of the articulated hinge structure 213 facing the curved surface 250 may define a curved surface, and another portion of the articulated hinge structure 213 that does not face the curved surface 250 may define a flat surface. According to an embodiment, the second display region A2 of the display 203 may be mounted or supported on the articulated hinge structure 213, and in the open state (e.g., FIG. 3), at least a portion of the second display region A2 may be exposed to the outside of the second housing 202 together with the first display region A1. In the state in which the second display area A2 is exposed to the outside of the second housing 202, the articulated hinge structure 213 may support or maintain the second display area A2 in the flat state by defining a substantially flat surface. According to an embodiment, the articulated hinge structure 213 may be replaced with a bendable integrated support member (not illustrated).

According to various embodiments, the second housing 202 may include a second plate 221, a second plate cover 222, and/or a third plate 223. The second plate 221 may support, for example, the electronic device 101 as a whole. The second plate 221 may include one surface on which the first plate 211 is disposed and the other surface on which the printed circuit board 204 is placed. According to an embodiment, the second plate 221 may accommodate components of the electronic device 101 (e.g., the battery 289 (e.g., the battery 189 in FIG. 1) or the circuit board 204). The second plate cover 222 may protect various components positioned on the second plate 221.

According to various embodiments, on the circuit board 204, a processor, a memory, and/or an interface may be disposed. The processor may include, for example, one or more of a central processing unit, an application processor, a graphics processing unit, an image signal processor, a sensor hub processor, or a communication processor. According to various embodiments, the circuit board 204 may include a flexible printed circuit board type radio frequency cable (FRC). For example, the circuit board 204 may be disposed on at least a portion of the second plate 221, and may be electrically connected to an antenna module (e.g., the antenna module 197 in FIG. 1) and a communication module (e.g., the communication module 190 in FIG. 1).

According to an embodiment, the memory may include, for example, a volatile memory or a nonvolatile memory.

According to an embodiment, the interface may include, for example, a high-definition multimedia interface (HDMI), a universal serial bus (USB) interface, an SD card interface, and/or an audio interface. The interface may electrically or physically connect, for example, the electronic device 101 to an external electronic device and may include a USB connector, an SD card/an MMC connector, or an audio connector.

According to various embodiments, the battery 289 is a device for supplying power to at least one component of the electronic device 101 and may include, for example, a non-rechargeable primary battery, a rechargeable secondary battery, or a fuel cell. At least a portion of the battery 289 may be disposed on substantially the same plane as, for example, the circuit board 204. The battery 289 may be integrally disposed inside the electronic device 101, or may be disposed to be detachable from the electronic device 101.

According to an embodiment, the third plate 223 may substantially define at least a portion of the exterior of the second housing 202 or the electronic device 101. For example, the third plate 223 may be coupled to the outer surface of the second plate cover 222. According to an embodiment, the third plate 223 may be configured integrally with the second plate cover 222. According to an embodiment, the third plate 223 may provide a decorative effect on the exterior of the electronic device 101. The second plate 221 and the second plate cover 222 may be manufactured using at least one of a metal or a polymer, and the third plate 223 may be manufactured using at least one of metal, glass, synthetic resin, or ceramic. According to an embodiment, the second plate 221, the second plate cover 222, and/or the third plate 223 may be at least partially (e.g., in an auxiliary display area) made of a material that transmits light. For example, in the state in which a portion of the display 203 (e.g., the second display area A2) is accommodated in the inside of the electronic device 101, the electronic device 101 may output visual information using the second display area A2. The auxiliary display area may be a portion of the second plate 221, the second plate cover 222, and/or the third plate 223 in which the display 203 accommodated in the inside of the second housing 202 is positioned.

Figure 5A:
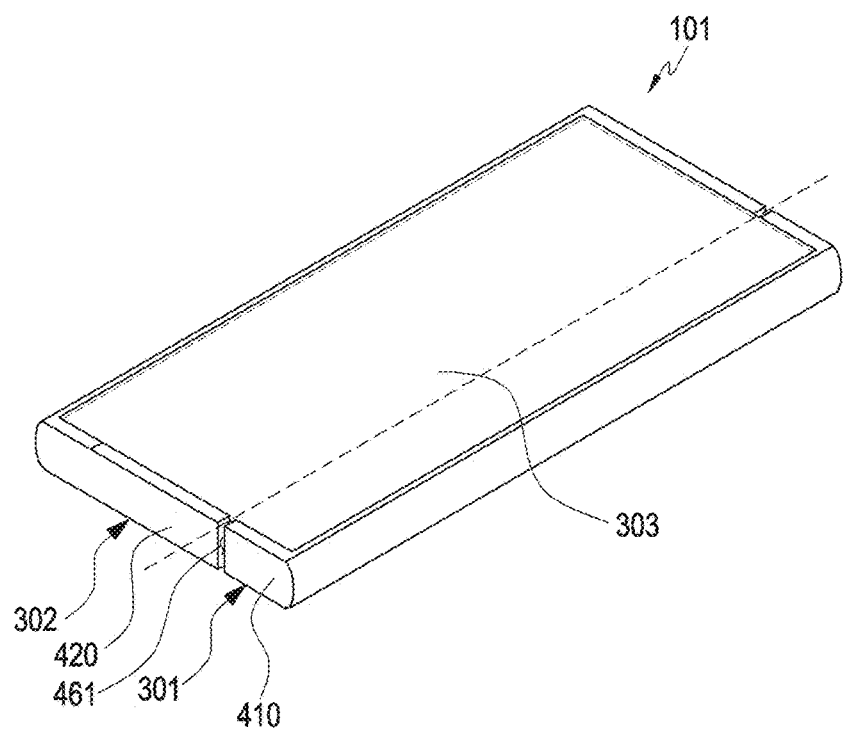
FIG. 5A is a perspective view of a first housing and a second housing illustrating a segmented portion in the closed state (the slide-in state) of the electronic device, according to various embodiments.

FIG. 5A is a perspective view of a first housing and a second housing illustrating a segmented portion in the closed state (the slide-in state) of the electronic device, according to various embodiments.

Figure 5B:
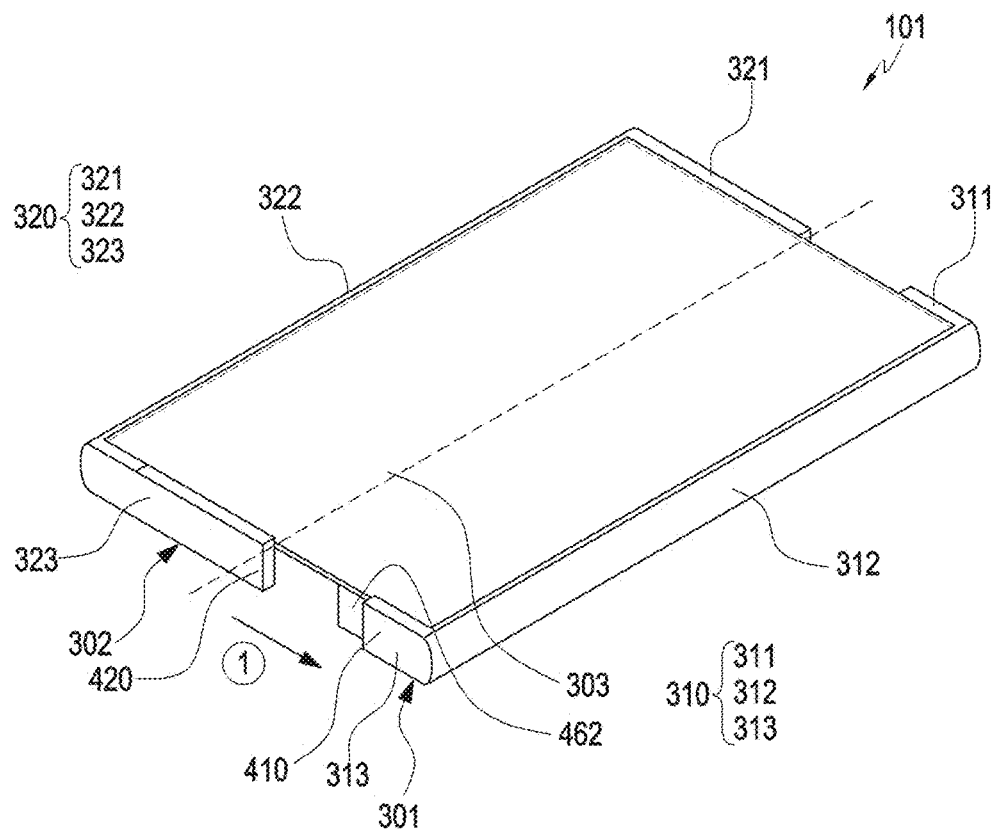
FIG. 5B is a perspective view of the first housing and the second housing illustrating the segmented portion in the opened state (the slide-out state) of the electronic device, according to various embodiments.

FIG. 5B is a perspective view of the first housing and the second housing illustrating the segmented portion in the opened state (the slide-out state) of the electronic device, according to various embodiments.

Figure 6:
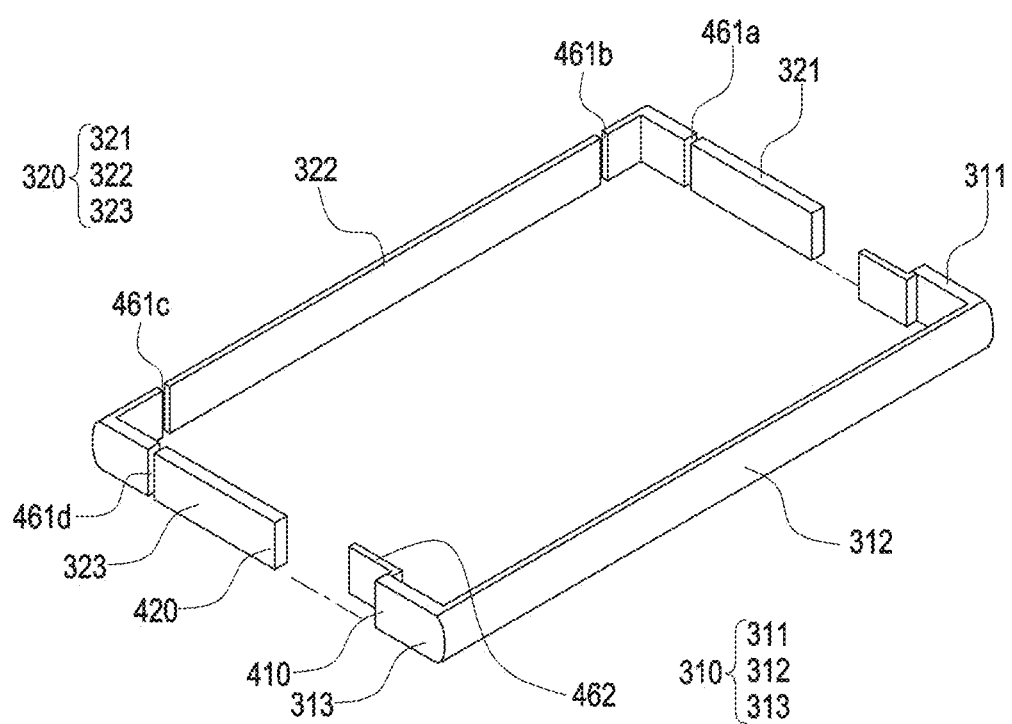
FIG. 6 is a perspective view of a side frame of the first housing and a side frame of the second housing illustrating segmented portions, according to various embodiments.

FIG. 6 is a perspective view of a side frame of the first housing and a side frame of the second housing illustrating segmented portions, according to various embodiments.

According to various embodiments, the electronic device 101 may include a first housing 301, a second housing 302, and a flexible display 303. The electronic device 101 may further include an antenna structure, wherein at least one component (e.g., a conductive portion) of the antenna structure may be located in an area of the first housing 201 and/or the second housing 202. The electronic device 101 may further include various components (e.g., a printed circuit board, a camera module, and a battery) disposed inside the first housing 301 and/or the second housing 302.

The configurations of the first housing 301, the second housing 302, and the flexible display 303 of FIGS. 5A, 5B and 6 may be wholly or partly the same as or similar to those of the first housing 201, the second housing 202, and the flexible display 203 of FIGS. 2, 3 and 4.

According to various embodiments, as the first housing 301 (and the flexible display 303 connected to the first housing 301) slides in or out relative to the second housing 302, the electronic device 101 may be in the closed state or the opened state.

According to various embodiments, the first housing 301 is slidable in a first direction (e.g., the direction ①) relative to the second housing 302. The first housing 301 may include a first conductive portion 410. For example, the first conductive portion 410 may be a frame (hereinafter, referred to as a "first frame 310") formed of a metal material of the first housing 201, and may be used as an antenna radiator. In an embodiment, one end of the first conductive portion 410 may be segmented (e.g., a segmented portion 461) such that the first conductive portion 410 is used as an antenna radiator.

According to various embodiments, the second housing 302 may accommodate at least a portion of the first housing 301 and guide the sliding movement of the first housing 301 (and the flexible display 303). The second housing 302 may include a second conductive portion 420. For example, the second conductive portion 420 may be a frame (hereinafter, referred to as a "second frame 320") formed of a metal material of the second housing 202, and may be used as an antenna radiator. In an embodiment, one end of the first conductive portion 410 may be segmented (e.g., a segmented portion 461) such that the second conductive portion 420 is used as an antenna radiator. For example, the segmented portion 461 may be located between the first conductive portion 410 and the second conductive portion 420.

According to various embodiments, the first frame 310 of the first housing 301 may provide at least a portion of the side surface of the first housing 301. The first frame 310 may include a $(1-1)^{th}$ side portion 311 (e.g., the $(1-2)^{th}$ sidewall 211b in FIG. 3), a $(1-2)^{th}$ side portion 312 (e.g., the $(1-1)^{th}$ sidewall 211a in FIG. 3) extending from the $(1-1)^{th}$ side portion 311 and disposed in a direction (e.g., the vertical direction) different from that of the $(1-1)^{th}$ side portion 311, and a $(1-3)^{th}$ side portion 313 (e.g., the $(1-3)_{th}$ sidewall 211c in FIG. 3) extending from the $(1-2)^{th}$ side portion 312 and disposed in the same direction as the $(1-1)^{th}$ side portion 311. The second frame 320 of the second housing 202 may provide at least a portion of the side surface of the second housing 202. The second frame 320 may include a $(2-1)^{th}$ side portion 321 (e.g., the $(2-2)^{th}$ sidewall 221b in FIG. 3), a $(2-2)^{th}$ side portion 322 (e.g., the $(2-1)^{th}$ sidewall 221a in FIG. 3) extending from the $(2-1)^{th}$ side portion 321 and disposed in a direction (e.g., the vertical direction) different from that of the $(2-1)^{th}$ side portion 321, and a $(2-3)^{th}$ side portion 323 (e.g., the $(2-3)^{th}$ sidewall 221c in FIG. 3) extending from the $(2-2)^{th}$ side portion 322 and disposed in the same direction as the $(2-1)^{th}$ side portion 321.

According to various embodiments, the first frame 310 and the second frame 320 may provide an outer surface of the electronic device 101 and may be disposed to be spaced apart from each other. For example, a segmented portion 461 may be provided between the first frame 310 and the second frame 320 to be electrically separated from each other. As another example, the first frame 310 may be designed to have a "]" shape, and the second frame 320 may be designed to have a "[" shape. In the state in which the first housing 301 is closed relative to the second housing 302, the first frame 310 and the second frame 320 may be designed to have a substantially rectangular frame shape (including the segmented portion 461). In the state in which the first housing 301 is opened relative to the second housing 302, the segmented portion 461 may be expanded.

According to various embodiments, the segmented portion 461 may have various shapes (e.g., materials) in which the first frame 310 and the second frame 320 may be physically/electrically spaced apart from each other. For example, the segmented portion 461 may be formed as an air gap to separate the first frame 310 and the second frame 320 from each other. As another example, the segmented portion 461 may be referred to as an opening, a recess, or a groove.

According to various embodiments, in the closed state, the non-conductive portion 462 overlapping the antenna radiator (e.g., the second conductive portion 420) of the second frame 320 may be formed of an insulating material to electrically separate the metal portion of the first frame 310 and the antenna radiator portion of the second frame 320. The non-conductive portion 462 may provide a dielectric constant different from that of a conductive portion (e.g., the first conductive portion 410 and/or the second conductive portion 420). For example, the non-conductive portion 462 may include any material that is insulative, including an elastomer material, ceramic, mica, glass, plastic, a metal oxide, air, and/or other materials that are superior in insulation to metal, but not limited to these materials.

According to various embodiments, at least a portion of the first frame 310 or at least a portion of the second frame 320 may be disposed not to overlap each other. For example, when a portion of the second frame 320 (e.g., the $(2\text{-}3)^{th}$ side portion 323) is used as an antenna radiator, the portion may be disposed always (e.g., when the first frame 310 relative to the second frame 320 are in the closed and opened states) not to overlap a portion of the first frame 310 (e.g., the $(1\text{-}3)^{th}$ side portion 313). As another example, when a portion of the second frame 320 (e.g., the $(2\text{-}1)^{th}$ side portion 321) is used as an antenna radiator, the portion may be disposed always (e.g., when the first frame 310 and the second frame 320 are in the closed and opened states) not to overlap a portion of the first frame 310 (e.g., the $(1\text{-}1)^{th}$ side portion 311).

According to various embodiments, in addition to the segmented portion (e.g., the segmented portion 461) provided between the first frame 310 and the second frame 320, each frame may include a plurality of segmented portions. For example, as illustrated in FIG. 6, in the second frame 320, one segmented portion 461a segmenting the $(2\text{-}1)^{th}$ side portion 321, two segmented portions 461b and 461c segmenting the $(2\text{-}2)^{th}$ side portion 322, and one segmented portion 461d segmenting the $(2\text{-}3)^{th}$ side portion 323. However, the plurality of segmented portions correspond to an example, and the segmented portions may be changed in various ways according to a frequency range used by an antenna.

According to various embodiments, by providing the first frame 310 and the second frame 320 such that unlike a metal antenna structure of an existing slidable terminal, a structure in which a portion of the first frame 310 used as an antenna radiator and the second frame 320 overlap each other can be avoided and a separation operation can be generated with reference to the segmented portion, it is possible to reduce a deviation in antenna performance physically generated in the state in which the screen of the display 203 is contracted or expanded.

Figure 7A:
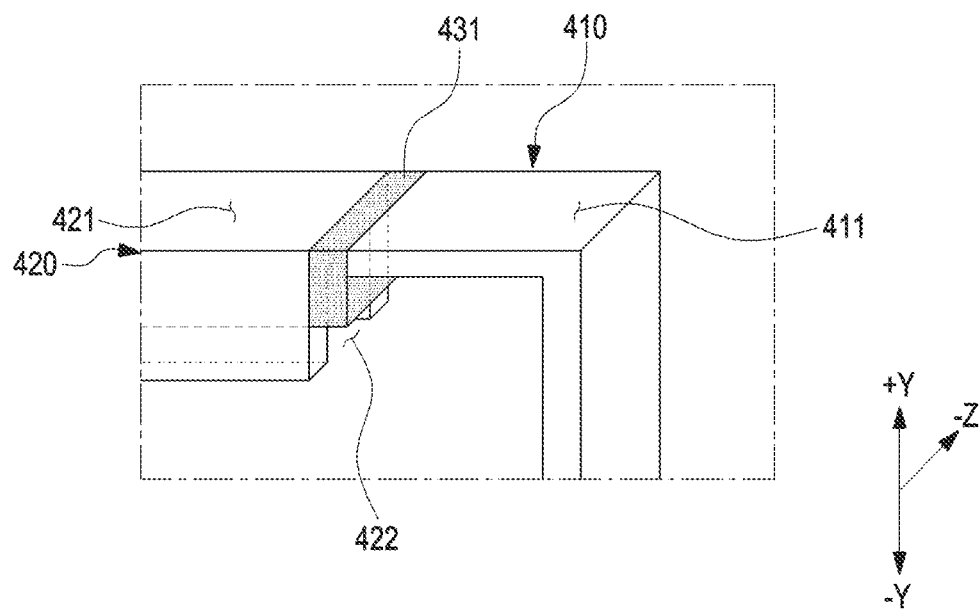
FIG. 7A is an enlarged perspective view of an area of the first housing and the second housing illustrating a segmented portion in the state in which the electronic device is closed according to various embodiments.

FIG. 7A is an enlarged perspective view of an area of the first housing and the second housing illustrating a segmented portion in the state in which the electronic device is closed according to various embodiments.

Figure 7B:
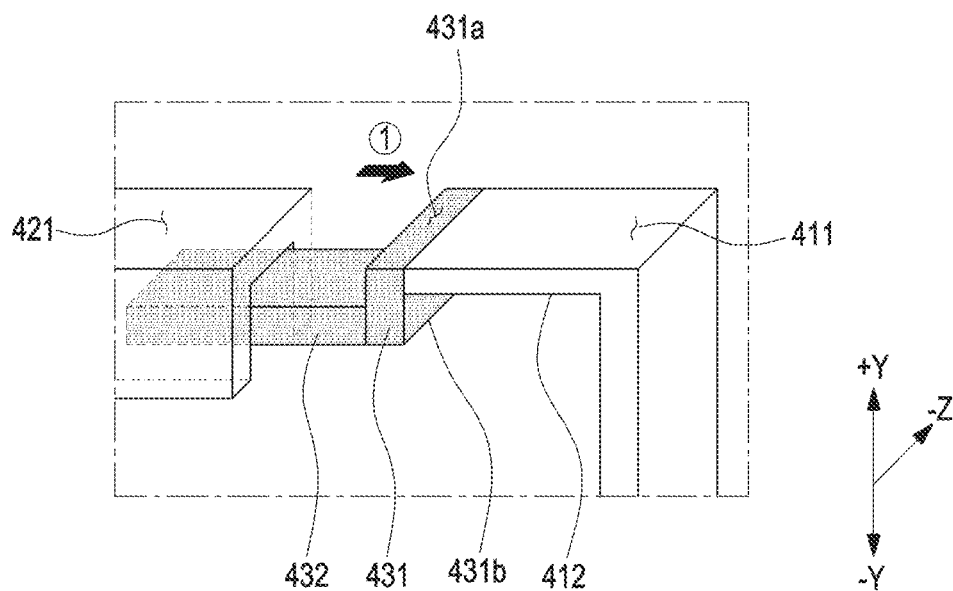
FIG. 7B is an enlarged perspective view of an area of the first housing and the second housing illustrating a segmented portion in the state in which the electronic device is open according to various embodiments.

FIG. 7B is an enlarged perspective view of an area of the first housing and the second housing illustrating a segmented portion in the state in which the electronic device is open according to various embodiments.

According to various embodiments, the electronic device 101 may include a first housing (e.g., the first housing 301 in FIGS. 5A and 5B) and a second housing (e.g., the second housing 302 in FIGS. 5A and 5B). The electronic device 101 may further include an antenna structure, wherein at least one component (e.g., a conductive portion) of the antenna structure may include a portion of the first housing 301 and/or the second housing 302.

According to various embodiments, as the first housing 301 (and the flexible display (not illustrated) connected to the first housing 301) slides in or out relative to the second housing 302, the electronic device 101 may be in the closed state or the opened state.

According to various embodiments, the first housing 301 may include a first conductive portion 410, a first segmented portion 431 extending from the first conductive portion 410, and a first non-conductive portion 432 disposed adjacent to the first segmented portion 431.

According to various embodiments, the second housing 302 may include a second conductive portion 420, and the second conductive portion 420 may be used as a radiator of an antenna structure. According to an embodiment, at least a portion of the second housing 302 may include a metal frame (e.g., the second frame 320 in FIGS. 5A to 6), and at least a portion of the metal frame may be the second conductive portion 420.

According to an embodiment, the second conductive portion 420 may include a recess 422 in which at least a portion of the first non-conductive portion 432 is slidable. For example, the recess 422 may have a groove shape formed along the inner surface of the second conductive portion 420. The recess 422 may be designed to have a size corresponding to at least a portion of the non-conductive portion 432, and may guide the sliding movement of the non-conductive portion 432.

According to various embodiments, the first segmented portion 431 may include an insulating material to separate the first conductive portion 410 and the second conductive portion 420 from each other, and thus the first conductive portion 410 or the second conductive portion 420 may operate as an antenna radiator. According to an embodiment, the first segmented portion 431 and the first non-conductive portion 432 may be integrally configured. The first segmented portion 431 and the first non-conductive portion 432 may be designed to have a stepped shape. For example, the first segmented portion 431 may be a portion extending from one end of the first conductive portion 410 in the −Y-axis direction, and the first non-conductive portion 432 may be a portion extending from the first conductive portion 410 toward the second conductive portion 420 to be movable along the recess 422.

According to an embodiment, the first segmented portion 431 may be located between the first conductive portion 410 and the second conductive portion 420 in order to substantially prevent and/or reduce the first conductive portion 410 and the second conductive portion 420 from coming into contact with each other. As illustrated in 7A and 7B, when viewed from the front side of the first housing 301 (and the second housing 302) (e.g., in the −Z-axis direction), the $(1\text{-}1)^{th}$ portion 431 may be configured to extend in a second direction (e.g., the Y-axis direction) perpendicular to a first direction ① (e.g., the slide movement direction). For example, the top surface 431a (e.g., the surface oriented in the Y-axis direction) of the first segmented portion 431 may be located on substantially the same plane as the top surface 411 of the first conductive portion 410 and/or the top surface 421 of the second conductive portion 420. The bottom surface 431b (e.g., the surface oriented in the −Y-axis direction) of the first segmented portion 431 may be located in a lower direction (e.g., the −Y-axis direction) than the bottom surface 412 of the first conductive portion 410.

According to an embodiment, at least a portion of the first non-conductive portion 432 may slide along the recess 422 of the second conductive portion 420 in the first direction ①. As illustrated in FIGS. 7A and 7B, when viewed from the front side of the first housing 301 (and the second housing 302) (e.g., in the −Z-axis direction), the first non-conductive portion 432 may be configured to extend from the lower end of the first segmented portion 431 in a direction opposite to the first direction ① (e.g., the slide movement direction).

According to various embodiments, the first conductive portion 410 and the second conductive portion 420 may be always spaced apart from each other. According to an embodiment, when viewing the first housing 301 and the second housing 302 in the Y-axis direction, the first conductive portion 410 and the second conductive portion 420 may not overlap each other. For example, from the closed state (e.g., FIG. 7A) to the opened state (e.g., FIG. 7B) of the first housing 301 relative to the second housing 302, the first conductive portion 410 and the second conductive portion 420 may maintain a spaced-apart state.

According to an embodiment, in the closed state of the first housing 301 relative to the second housing 302 (e.g., FIG. 7A), the first non-conductive portion 432 overlaps the second conductive portion 420. In the open state of the first housing 301 relative to the second housing 302 (e.g., FIG. 7B), at least a portion of the first non-conductive portion 432 may be disposed to overlap the second conductive portion 420.

According to an embodiment, in the closed state, the first conductive portion 410 may be disposed to be spaced apart from the second conductive portion 420 with the first segmented portion 431 interposed therebetween. In the closed state, the top surface 411 of the first conductive portion 410, the top surface 431a of the first segment 431, and the top surface 421 of the second conductive portion 420 are exposed to the outside, and may form substantially one plane. The first non-conductive portion 432 may be located entirely within the recess 422 of the second conductive portion 420.

According to an embodiment, in the opened state, the first conductive portion 410 may be disposed to be spaced apart from the second conductive portion 420 with the first segmented portion 431 interposed therebetween. In the opened state, due to the sliding movement, the top surface 411 of the first conductive portion 410 and the top surface 431a of the first segmented portion 431 may form a relatively increased separation distance from the top surface 421 of the second conductive portion 420 compared with the closed state. A portion of the first non-conductive portion 432 may be exposed to the outside as it slides, and the other portion may be located within the recess 422 of the second conductive portion 420.

According to an embodiment, since the first conductive portion 410 and the second conductive portion 420 are spaced apart from each other in the closed state and the open state, it is possible to reduce a deviation in antenna performance physically generated in the contracted or expanded state of the flexible display screen when at least a portion of the second conductive portion 420 is used as an antenna radiator. In addition, it is possible to provide an antenna structure in which resonance characteristics can be maintained similarly between the closed operation and the opened operation.

Figure 8A:
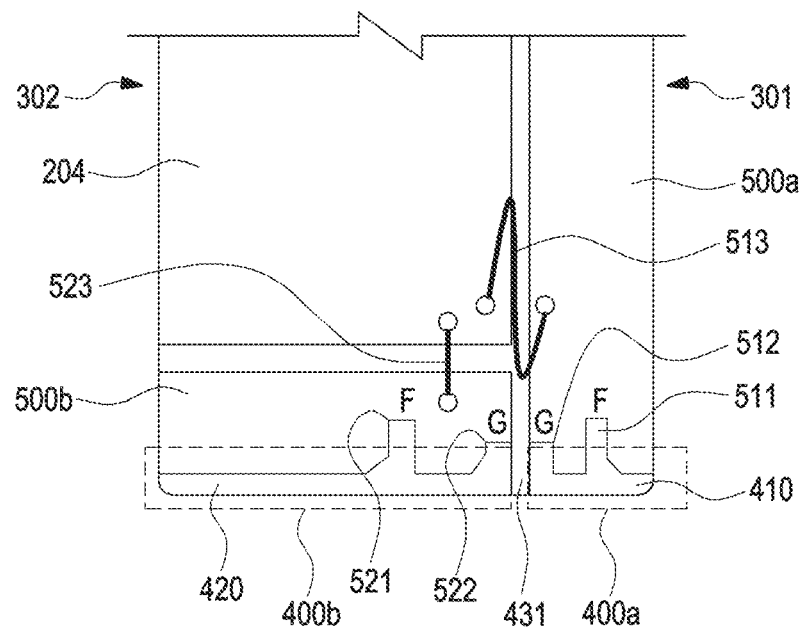
FIG. 8A is a diagram illustrating an internal antenna structure of the electronic device in a state in which the electronic device is closed according to various embodiments.

FIG. 8A is a diagram illustrating an internal antenna structure of the electronic device in the state in which the electronic device is closed according to various embodiments.

Figure 8B:
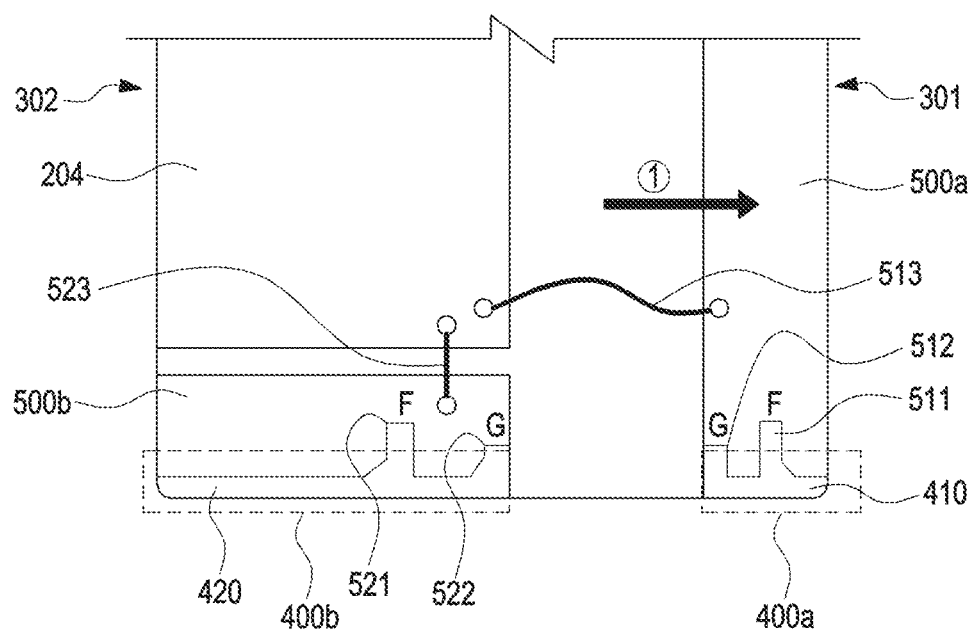
FIG. 8B is a diagram illustrating an internal antenna structure of the electronic device in a state in which the electronic device is open according to various embodiments.

FIG. 8B is a diagram illustrating an internal antenna structure of the electronic device in the state in which the electronic device is open according to various embodiments.

According to various embodiments, the electronic device 101 may include a first housing 301, a second housing 302, a main circuit board 204, a first sub-board 500a, and/or a second sub-board 500b.

The configurations of the first housing 301 and the second housing 302 of FIGS. 8A and 8B may be wholly or partly the same as or similar to those of the first housing 301 and the second housing 302 of FIGS. 5A to 6. The configuration of the main circuit board 204 of FIGS. 8A and 8B may be wholly or partly the same as or similar to that of the circuit board 204 of FIG. 4.

According to various embodiments, the main circuit board 204 and the second sub-board 500b may be disposed in the second housing 302. The main circuit board 204 and the second sub-board 500b may be electrically connected to each other by a connection member 523 (e.g., an RF cable).

According to an embodiment, a processor, a memory, and/or an interface may be disposed on the main circuit board 204. The processor may include, for example, one or more of a central processing unit, an application processor, a graphics processing unit, an image signal processor, a sensor hub processor, or a communication processor. According to various embodiments, the main circuit board 204 may include a flexible printed circuit board type radio frequency cable (RFC). For example, the main circuit board 204 may be electrically connected to an antenna structure (e.g., the antenna module 197 in FIG. 1) and a communication module (e.g., the communication module 190 in FIG. 1).

According to an embodiment, the memory may include, for example, a volatile memory or a nonvolatile memory. According to an embodiment, the interface may include, for example, a high-definition multimedia interface (HDMI), a universal serial bus (USB) interface, an SD card interface, and/or an audio interface. The interface may electrically or physically connect, for example, the electronic device 101 to an external electronic device and may include a USB connector, an SD card/an MMC connector, or an audio connector.

According to various embodiments, the first sub-board 500a may be disposed in the first housing 301. The main circuit board 204 and the first sub-board 500a may be electrically connected to each other by a flexible connection member 513 (e.g., an RF cable).

According to various embodiments, the first antenna structure 400a may be located in the first housing 301. The first antenna structure 400a may include a first antenna pattern (e.g., the first conductive portion 410), a first feeding portion 511, and a first ground portion 512. The first housing 301 may include a first conductive portion 410 formed of a metal frame, and at least a portion of the first conductive portion 410 may be used as the first antenna pattern (e.g., an antenna radiator). For example, the first conductive portion 511 acting as an antenna may be configured to transmit and/or receive radio frequency (RF) signals.

According to various embodiments, at one end (or both ends) of the first conductive portion 410, a non-conductive portion (e.g., the first segmented portion 431) is provided, and the first conductive portion 410 and the first segmented portion 431 may be designed to have an arbitrary length in order to implement an antenna of a desired frequency band. Although not illustrated in the drawings, the first feeding portion 511 and/or the first ground portion 512 may include a contact structure (e.g., a C-Clip or the like) for electrically connecting to the first sub-board 500a.

According to various embodiments, the first feeding portion 511 may be a portion extending from the first conductive portion 410 of the first housing 301 to the inside of the electronic device 101. The first feeding portion 511 may be electrically connected to the first sub-board 500a disposed in the first housing 301 to transmit current to the first antenna pattern (e.g., the first conductive portion 410). According to an embodiment, the first sub-board 500a may be electrically connected to the main circuit board 204 by the flexible connection member 513 (e.g., an RF cable). For example, when the first housing 301 is slid relative to the second housing 302 from the closed state to the opened state, the flexible connection member 513, which is designed as a flexible cable, may be deformable to accommodate an increase in the separation distance of the first housing 301 to the first housing 301. Accordingly, from the closed state to the opened state, the electrical connection to the main circuit board 204 for using the first conductive portion 410 as an antenna may be always maintained.

According to an embodiment, a transmission/reception (Tx/Rx) terminal of the communication circuit disposed on the main circuit board 340 may be connected to the first feeding portion 511 to perform communication. The electronic device 101 may include any type of elements for impedance matching, such as a switch, a resistive element, a capacitive element, an inductive element, or any combination thereof. The elements may be used to selectively change the antenna frequency band. In the illustrated embodiment, the first feeding portion 511 extends in a direction perpendicular to the longitudinal direction of the first conductive portion 410, but is not limited thereto. The first feeding portion may be design-changed to have another configuration having a different thickness and/or angle.

According to various embodiments, the first ground portion 512 may be disposed between the first segmented portion 431 and the first feeding portion 511. For example, the first ground portion 512 may be electrically connected to a portion of the first conductive portion 410. According to an embodiment, the first ground portion 512 may include an element or a switch for changing an impedance for adjusting a frequency band. For example, the first ground portion 512 may include an element that provides various electrical lengths by switching to a direct ground without passing through an inductor, a capacitor, a combination thereof, or an intermediate element at a ground stage to create resonances of various lengths in the physically identical first antenna pattern. As another example, the first ground portion 512 may be at least a portion extending from the first conductive portion 410 to the inside of the first housing 301. According to an embodiment, the first ground portion 512 may be connected to a portion of the first sub-board 500a in the first housing 301 directly or via a conductive member (not illustrated). For example, the first ground portion 512 may be electrically connected to a ground of the first sub-board 500a in the first housing 301. For example, the conductive member may include at least one of members such as a wire, a clip (e.g., a c-clip), a screw, and a conductive sponge.

According to an embodiment, the first ground portion 512 may be a ground of an element electrically connected to a feeding portion of another antenna (e.g., another conductive portion).

According to various embodiments, the second antenna structure 400b may be located in the second housing 302. The second antenna structure 400b may include a second antenna pattern (e.g., the second conductive portion 420), a second feeding portion 521, and a second ground portion 522. The second housing 302 may include a second conductive portion 420 formed of a metal frame, and at least a portion of the second conductive portion 420 may be used as the second antenna pattern (e.g., an antenna radiator). For example, the second conductive portion 420 acting as an antenna may be configured to transmit and/or receive radio frequency (RF) signals. The configurations of the first conductive portion 410, the first feeding portion 511, and the first ground portion 512 of the first antenna structure 400a may be applicable to the configurations of the second conductive portion 420, the second feeding portion 521, and the second ground portion 522 of the second antenna structure 400b.

Figure 9:
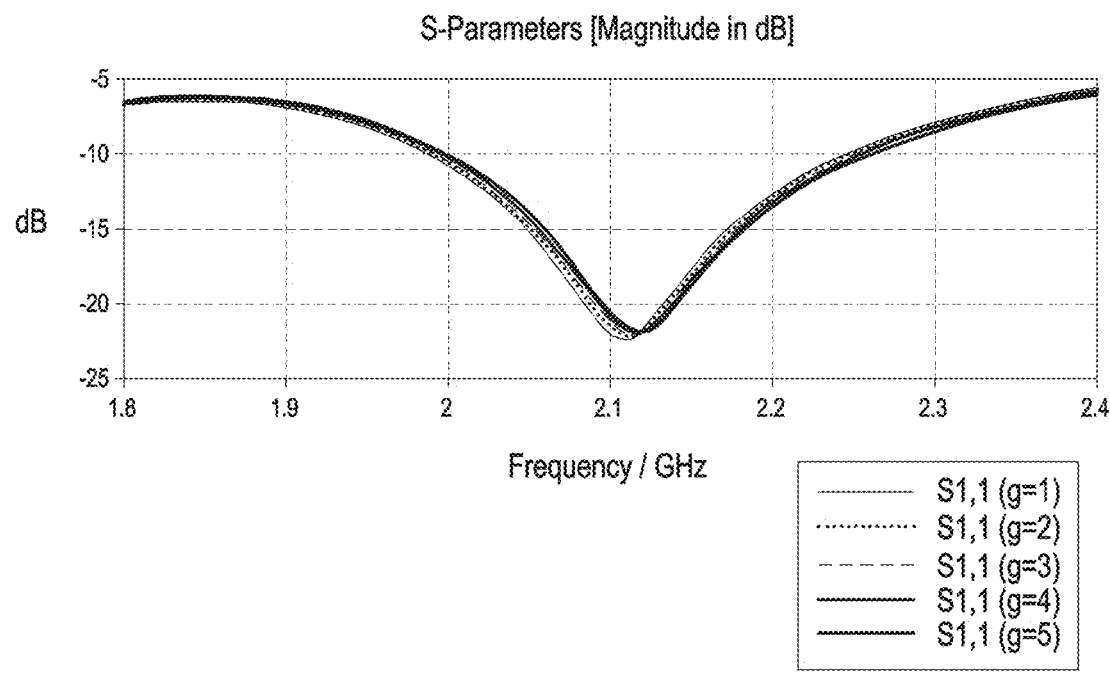
FIG. 9 is a graph showing antenna performance related to the first antenna structure by the sliding operation between the housings in FIGS. 8A and 8B according to various embodiments.

FIG. 9 is a graph showing antenna performance related to the first antenna structure by the sliding operation between the housings in FIGS. 8A and 8B according to various embodiments.

Figure 10:
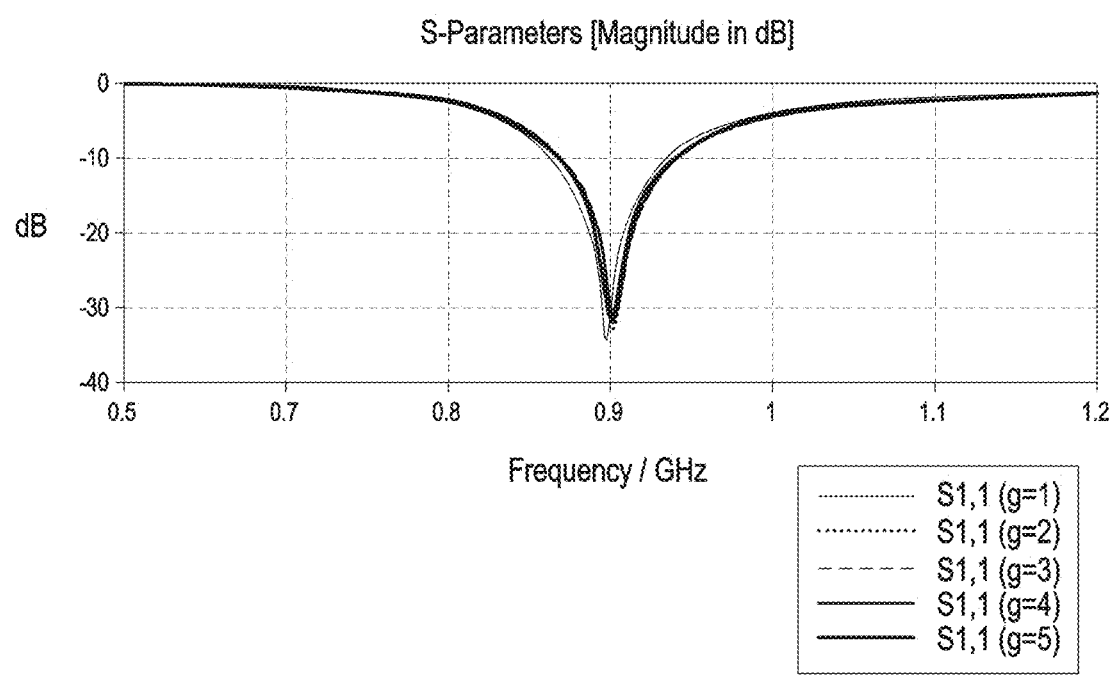
FIG. 10 is a graph showing antenna performance related to the second antenna structure by the sliding operation between the housings in FIGS. 8A and 8B according to various embodiments.

FIG. 10 is a graph showing antenna performance related to the second antenna structure by the sliding operation between the housings in FIGS. 8A and 8B according to various embodiments.

Referring to FIGS. 9 and 10, when the state in which the second housing is closed relative to the first housing (e.g., FIG. 8A) is changed to the state in which the first housing is opened relative to the second housing (e.g., FIG. 8B), the separation distance (g) between the second housing and the first housing was measured to vary (increase) from 1 mm to 5 mm (e.g., g=1, g=2, g=3, g=4, and g=5). For example, when the closed state, the first conductive portion (e.g., the first conductive portion 410 in FIGS. 7A to 8B) and the second conductive portion (e.g., the second conductive portion 420 in FIGS. 7A to 8B) were designed such that the distance between the first and second conductive portions (e.g., the first segmented portion 431 in FIGS. 7A to 8B)) is about 1 mm, and modeling was performed such that, when a slide operation is performed, the separation distance between the first conductive portion and the second conductive portion is gradually increased. When the separation distance was greater than a certain distance, the effect between the first conductive portion and the second conductive portion was insignificant. Thus, the maximum separation distance was simulated up to approximately 5 mm. The change in antenna performance was confirmed using S-parameters.

Referring to FIG. 9, it can be seen that the frequency of the antenna using the first conductive portion in FIGS. 8A and 8B is about 2100 MHz. When the electronic device including the first conductive portion, the second conductive portion, and the first segmented portion are provided according to the disclosure, it can be seen that there is little influence on the antenna performance according to the sliding operation of the first housing relative to the second housing. With the electronic device according to the disclosure, it is possible to provide an antenna structure in which resonance characteristics may be similarly maintained between slide-in and slide-out operations.

Referring to FIG. 10, it can be seen that the frequency of the antenna using the second conductive portion in FIGS. 8A and 8B is about 900 MHz. When the first conductive portion, the second conductive portion, and the first segmented portion are provided according to the disclosure, it can be seen that there is little influence on the antenna performance according to the sliding operation of the first housing relative to the second housing. With the electronic device according to the disclosure, it is possible to provide an antenna structure in which resonance characteristics may be similarly maintained between slide-in and slide-out operations.

Figure 11A:
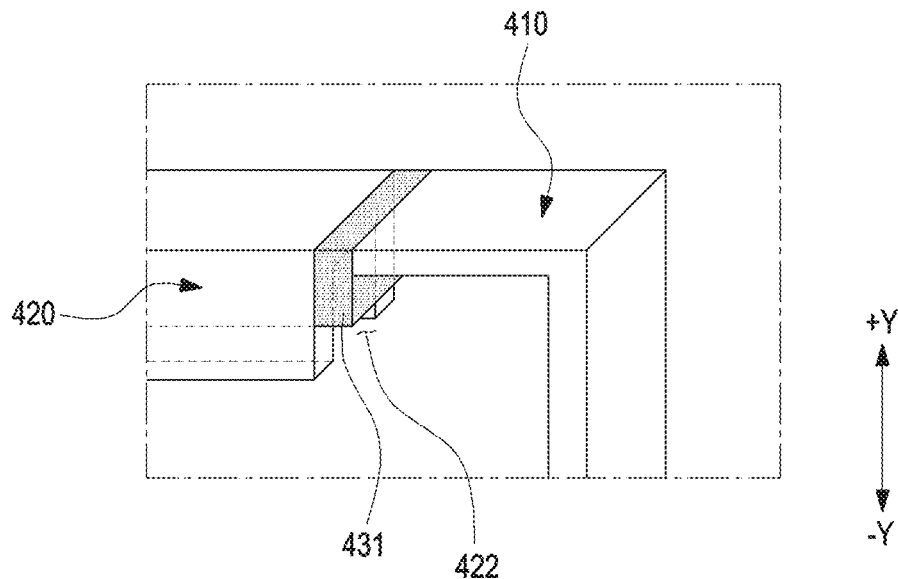
FIG. 11A is an enlarged perspective view of an area of the first housing and the second housing illustrating a segmented portion in a state in which the electronic device is closed according to various embodiments.

FIG. 11A is an enlarged perspective view of an area of the first housing and the second housing for illustrating a segmented portion in the state in which the electronic device is closed according to various embodiments.

Figure 11B:
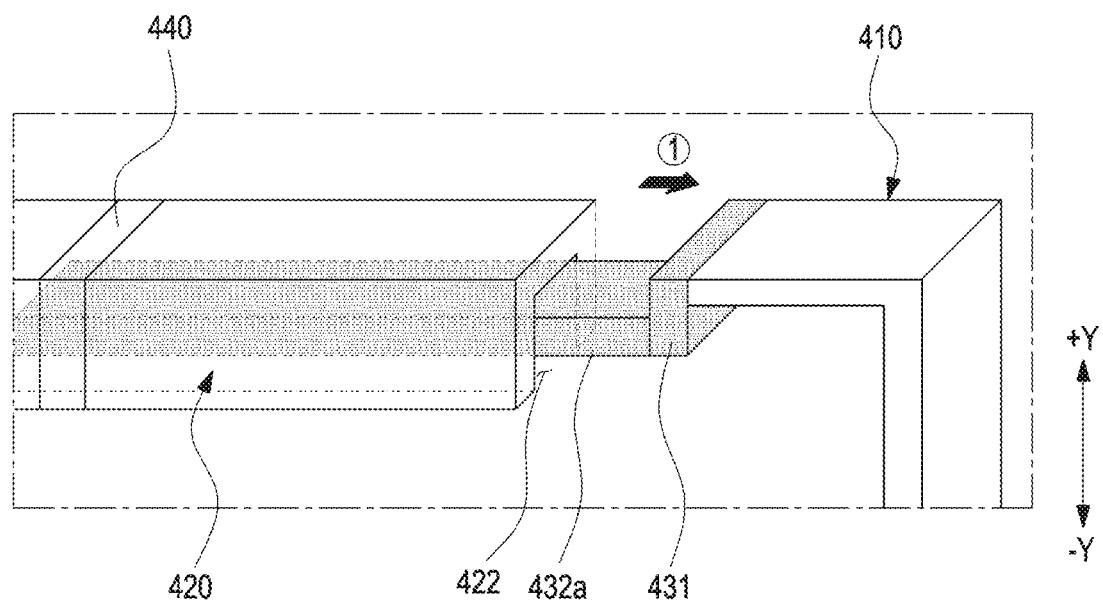
FIG. 11B is an enlarged perspective view of an area of the first housing and the second housing illustrating a segmented portion in a state in which the electronic device is open according to various embodiments.

FIG. 11B is an enlarged perspective view of an area of the first housing and the second housing for illustrating a segmented portion in the state in which the electronic device is open according to various embodiments.

According to various embodiments, the electronic device 101 may include a first housing (e.g., the first housing 301 in FIGS. 5A and 5B) and a second housing (e.g., the second housing 302 in FIGS. 5A and 5B). The electronic device 101 may further include an antenna structure, wherein at least one component (e.g., the first and second conductive portions) of the antenna structure may be an area of the first housing 301 and/or the second housing 302.

The configurations of the first conductive portion 410 and the second conductive portion 420 of FIGS. 11A and 11B may be partly or wholly the same as or similar to the configurations of the first conductive portion 410 and the second conductive portion 420 of FIGS. 5A to 7B.

According to various embodiments, as the first housing 301 (and the flexible display (not illustrated) connected to the first housing 301) slides in or out relative to the second housing 302, the electronic device may be in the closed state or the opened state. Hereinafter, a structure different from that of FIGS. 7A and 7B will be mainly described.

According to various embodiments, the first housing 301 may include a first conductive portion 410, a first segmented portion 431 extending from the first conductive portion 410, and a $(1-1)^{th}$ non-conductive portion 432 disposed adjacent to the first segmented portion 431.

According to various embodiments, the second housing 302 may include a second conductive portion 420 and a second segmented portion 440 extending from the second conductive portion 420, and the second conductive portion 420 may be used as a radiator of an antenna structure. According to an embodiment, the second conductive portion 420 and the second segmented portion 440 may include a recess 422 in which at least a portion of the $(1-1)^{th}$ non-conductive portion 432a is slidable. The recess 422 may be designed to have a size corresponding to, for example, at least a portion of the $(1-1)^{th}$ non-conductive portion 432a to guide the slide movement of the $(1-1)^{th}$ non-conductive portion 432a.

According to various embodiments, the second segmented portion 440 may include an insulating material, and may be disposed at opposite ends of the second conductive portion 420 together with the first segmented portion 431. The length of the second conductive portion 420 may be arbitrarily adjusted according to the position of the second segmented portion 440, and accordingly, the frequency band of the antenna may be selectively adjusted. As illustrated, the second segmented portion 440 is formed to segment the upper frame (e.g., the $(2-1)^{th}$ side portion 321 in FIG. 5B) of the second housing 302, but is not limited thereto. The second segmented portion 440 may be design-changed to segment an area of the left frame (e.g., the $(2-2)^{th}$ side portion 322 in FIG. 5B) or the lower frame (e.g., the $(2-3)^{th}$ side portion 323 in FIG. 5B) of the second housing 302.

According to various embodiments, the first segmented portion 431 and the $(1-1)^{th}$ non-conductive portion 432a may be designed to have a stepped shape. For example, the first segmented portion 431 may extend from one end of the first conductive portion 410, and the $(1-1)^{th}$ non-conductive portion 432a may extend from the first segmented portion 431 to be movable along the recess 422.

According to an embodiment, the first segmented portion 431 may be located between the first conductive portion 410 and the second conductive portion 420 in order to substantially prevent and/or reduce the first conductive portion 410 and the second conductive portion 420 from coming into contact with each other. According to an embodiment, the $(1-1)^{th}$ non-conductive portion 432a in FIG. 11B may be designed to have a longer length than the first non-conductive portion 432 of FIG. 7B. The length of the $(1-1)^{th}$ non-conductive portion 432a may be determined depending on a moving distance of the first housing 301. For example, since the $(1-1)^{th}$ non-conductive portion 432a, which is formed of an insulator, does not substantially affect the antenna radiation performance, the $(1-1)^{th}$ non-conductive portion may be designed to extend to the second segmented portion 440. However, the length of the $(1-1)^{th}$ non-conductive portion 432a is not limited to extending beyond the second segmented portion 440 as illustrated in the drawings, and may be design-changed to have various lengths that do not reach the second segmented portion 440.

Figure 12A:
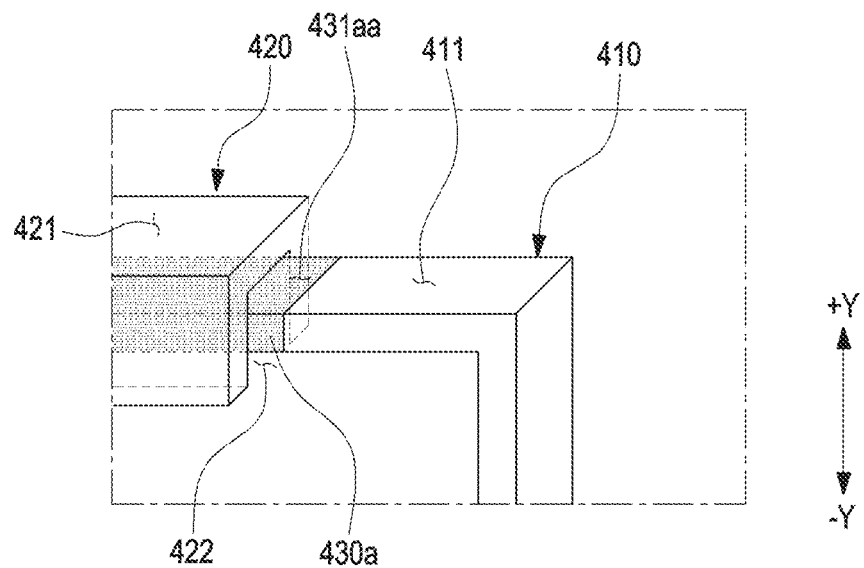
FIG. 12A is an enlarged perspective view of an area of the first housing and the second housing illustrating a segmented portion in a state in which the electronic device is closed according to various embodiments.

FIG. 12A is an enlarged perspective view of an area of the first housing and the second housing illustrating a segmented portion in the state in which the electronic device is closed according to various embodiments.

Figure 12B:
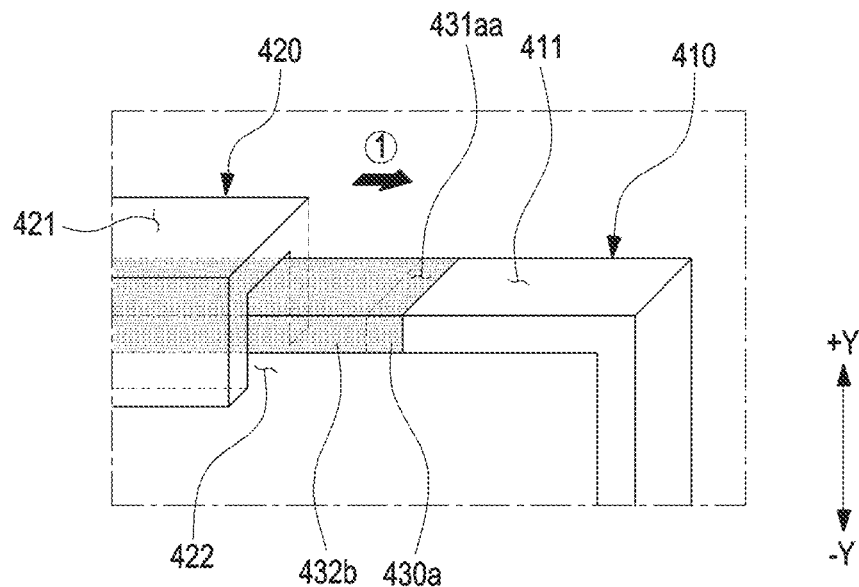
FIG. 12B is an enlarged perspective view of an area of the first housing and the second housing illustrating a segmented portion in the state in which the electronic device is open according to various embodiments.

FIG. 12B is an enlarged perspective view of an area of the first housing and the second housing illustrating a segmented portion in the state in which the electronic device is open according to various embodiments.

According to various embodiments, the electronic device 101 may include a first housing (e.g., the first housing 301 in FIGS. 5A and 5B) and a second housing (e.g., the second housing 302 in FIGS. 5A and 5B). The electronic device 101 may further include an antenna structure, wherein at least one component (e.g., the first and second conductive portions) of the antenna structure may be an area of the first housing 301 and/or the second housing 302.

The configurations of the first conductive portion 410 and the second conductive portion 420 of FIGS. 12A and 12B may be partly or wholly the same as or similar to the configurations of the first conductive portion 410 and the second conductive portion 420 of FIGS. 5A to 7B.

According to various embodiments, as the first housing 301 (and the flexible display (not illustrated) connected to the first housing 301) slides in or out relative to the second housing 302, the electronic device may be in the closed state or the opened state. Hereinafter, a structure different from that of FIGS. 7A and 7B will be mainly described.

According to various embodiments, the first housing 301 may include a first conductive portion 410, a $(1-1)^{th}$ segmented portion 430a extending from the first conductive portion 410, and a $(1-2)^{th}$ non-conductive portion 432b extending from the $(1-1)^{th}$ segmented portion 430a. For example, the $(1-1)^{th}$ segmented portion 430a and the $(1-2)^{th}$ non-conductive portion 432*b* may be formed of the same material in an integrated form.

According to various embodiments, the second housing 302 may include a second conductive portion 420, and the second conductive portion 420 may be used as a radiator of an antenna structure. According to an embodiment, the second conductive portion 420 may include a recess 422 in which at least a portion of the $(1\text{-}2)^{th}$ non-conductive portion 432 is slidable. The recess 422 may be designed to have a size corresponding to at least a portion of the $(1\text{-}2)^{th}$ non-conductive portion 432*b* to guide the sliding movement of the $(1\text{-}2)^{th}$ non-conductive portion 432*b*.

According to various embodiments, the $(1\text{-}1)^{th}$ segmented portion 430*a* and the $(1\text{-}2)^{th}$ non-conductive portion 432*b* may include an insulating material and may have a thickness corresponding to (e.g., the same as) the first conductive portion 410. In the closed state, the $(1\text{-}2)^{th}$ non-conductive portion 432*b* is accommodated in the recess 422, but an area adjacent to the first conductive portion 410 (e.g., the $(1\text{-}1)^{th}$ segmented portion 430*a*) may be exposed to the outside to space the first conductive portion 410 and the second conductive portion 420 apart from each other.

According to various embodiments, the top surface 431*aa* (e.g., the surface oriented in the +Y-axis direction) of the $(1\text{-}1)^{th}$ segmented portion 430*a* may be located on the same plane as the top surface 411 of the first conductive portion 410, but may not be located on the same plane as the top surface 421 of the second conductive portion 420. For example, the top surface 421 of the second conductive portion 420 protrudes upward in the +Y-axis direction with respect to the top surface 431*aa* of the $(1\text{-}1)^{th}$ segmented portion 430*a* and the top surface 411 of the first conductive portion 410.

According to various embodiments, in the closed state and the opened state, the second conductive portion 420 to be used as an antenna radiator is spaced apart from the first conductive portion 410 by the $(1\text{-}2)^{th}$ non-conductive portion 432*b*. Thus, it is possible to reduce a deviation in antenna performance physically occurring in the state in which the flexible display screen is contracted or expanded.

Figure 13A:
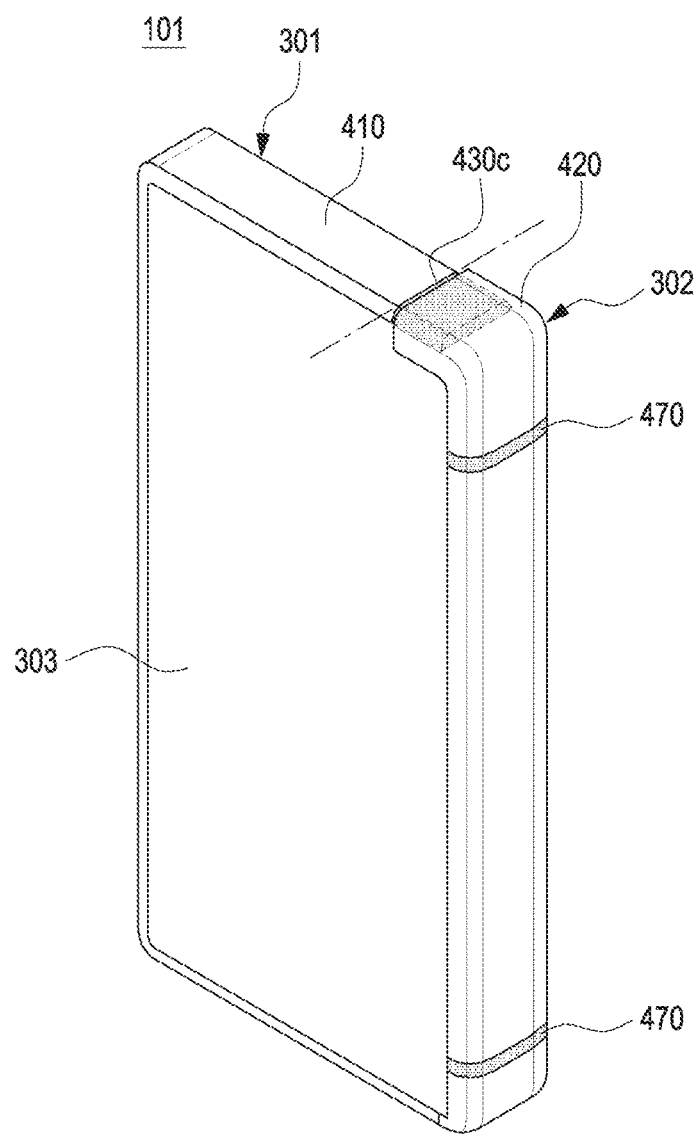
FIG. 13A is a perspective view of an area of the first housing and the second housing illustrating a segmented portion in the state in which the electronic device is closed according to various embodiments.

FIG. 13A is a perspective view of an area of the first housing and the second housing illustrating a segmented portion in the state in which the electronic device is closed according to various embodiments.

Figure 13B:
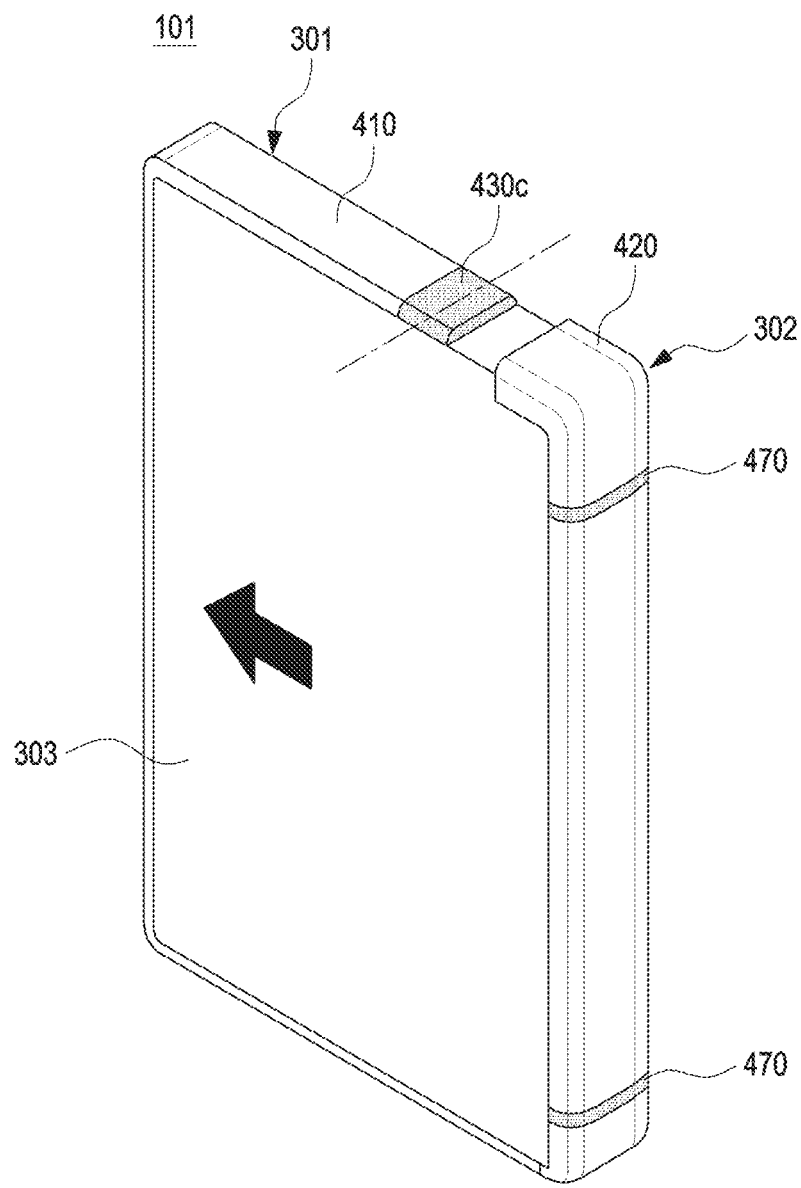
FIG. 13B is a perspective view of the first housing and the second housing illustrating a segmented portion in the state in which the electronic device is open according to various embodiments.

FIG. 13B is a perspective view of an area of the first housing and the second housing illustrating a segmented portion in the state in which the electronic device is open according to various embodiments of the disclosure.

According to various embodiments, the electronic device 101 may include a first housing 301, a second housing 302, and a flexible display 303. The electronic device 101 may further include an antenna structure, wherein at least one component (e.g., a conductive portion) of the antenna structure may be located in an area of the first housing 301 and/or the second housing 302.

The configurations of the first housing 301 and the second housing 302 of FIGS. 13A and 13B may be partly or wholly the same as or similar to those of the first housing 301 and the second housing 302 of FIGS. 5A to 7B.

According to various embodiments, as the first housing 301 (and the flexible display 303 connected to the first housing 301) slides in or out relative to the second housing 302, the electronic device may be in the closed state or the opened state. Hereinafter, a structure different from that of FIGS. 7A and 7B will be mainly described.

According to various embodiments, the first housing 301 may include a first conductive portion 410 and a $(1\text{-}3)^{th}$ segmented portion 430*c* extending from the first conductive portion 410, and the first conductive portion 410 may be used as a radiator of an antenna structure. According to an embodiment, the first conductive portion 410 may be a radiator having a relatively larger length compared to the second conductive portion 420.

According to various embodiments, the second housing 302 may include a second conductive portion 420 and a second segmented portion 470, and the second conductive portion 420 may be used as a radiator of an antenna structure. According to an embodiment, the second conductive portion 420 may include a recess (not illustrated) in which at least a portion of the $(1\text{-}3)^{th}$ segmented portion 430*c* is slidable. The recess may be designed to have a size corresponding to at least a portion of the $(1\text{-}3)^{th}$ segmented portion 430*c* to guide the slide movement of the $(1\text{-}3)^{th}$ segmented portion 430*c*.

Figure 14A:
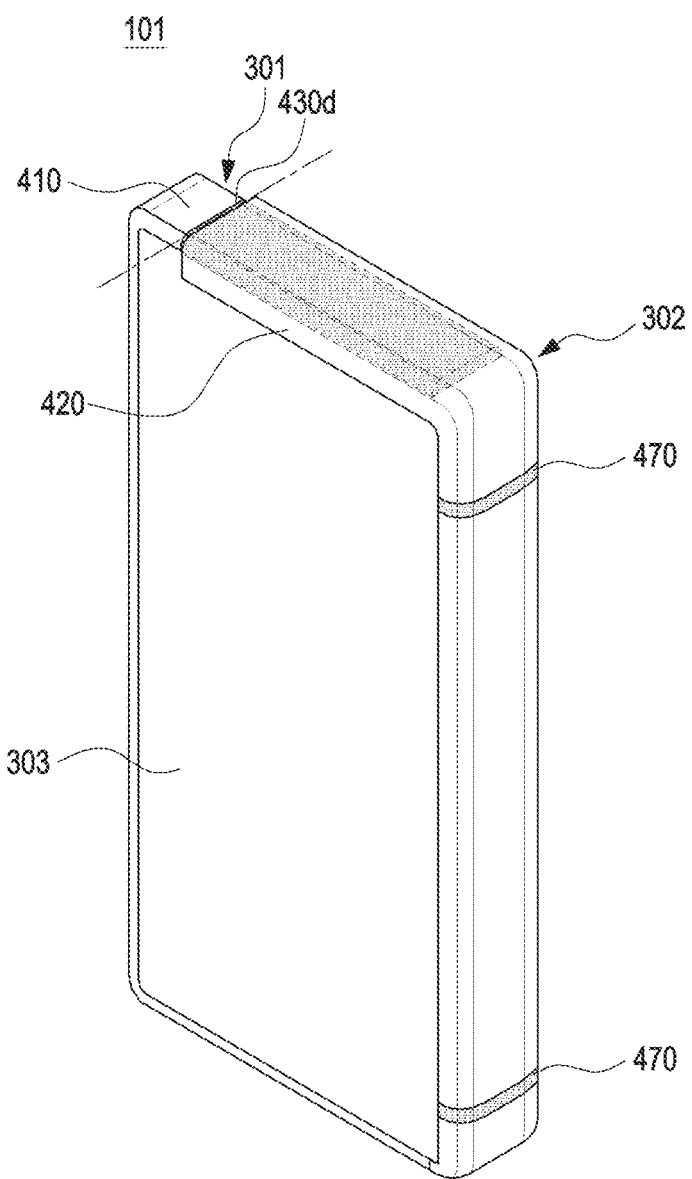
FIG. 14A is a perspective view of an area of the first housing and the second housing illustrating a segmented portion in the state in which the electronic device is closed according to various embodiments.

FIG. 14A is a perspective view of an area of the first housing and the second housing illustrating a segmented portion in the state in which the electronic device is closed according to various embodiments.

Figure 14B:
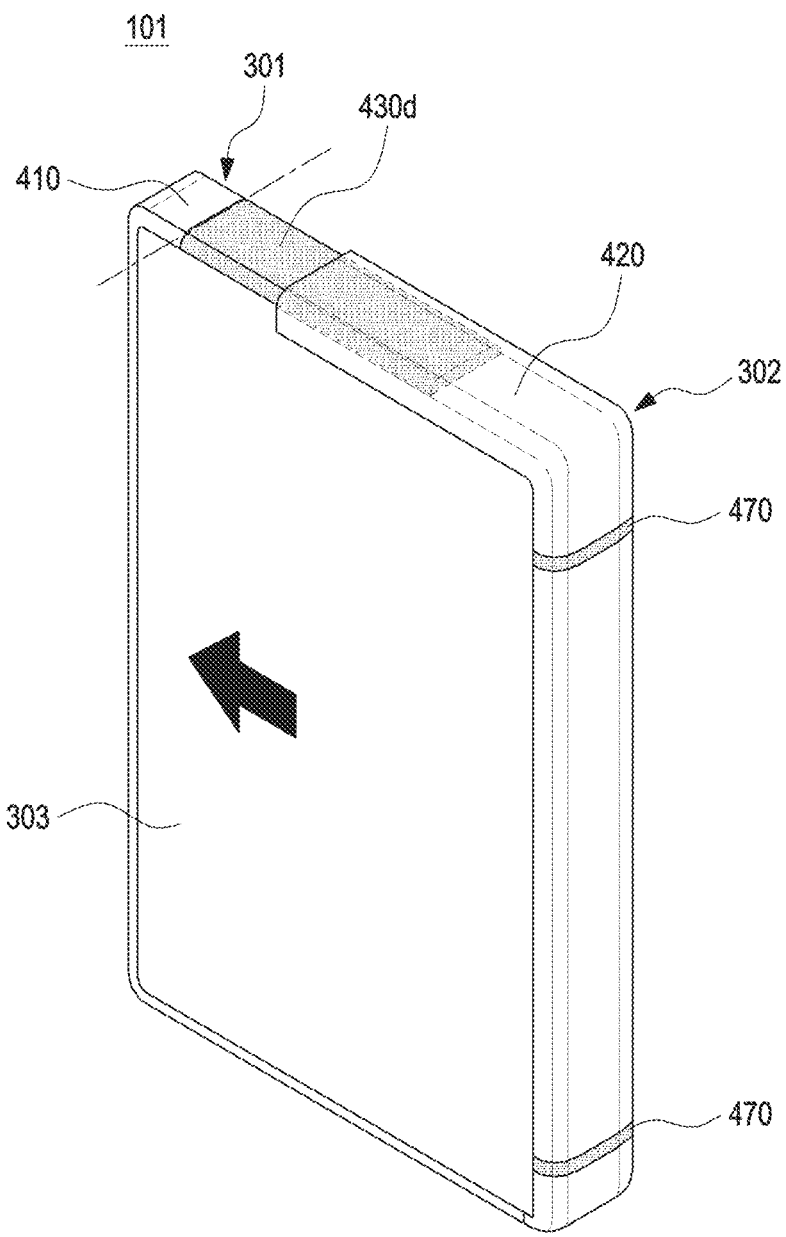
FIG. 14B is a perspective view of an area of the first housing and the second housing illustrating a segmented portion in the state in which the electronic device is open according to various embodiments.

FIG. 14B is a perspective view of an area of the first housing and the second housing illustrating a segmented portion in the state in which the electronic device is open according to various embodiments.

According to various embodiments, the electronic device 101 may include a first housing 301, a second housing 302, and a flexible display 303. The electronic device 101 may further include an antenna structure, wherein at least one component (e.g., a conductive portion) of the antenna structure may be an area of the first housing 301 and/or the second housing 302.

The configurations of the first housing 301 and the second housing 302 of FIGS. 14A and 14B may be partly or wholly the same as or similar to those of the first housing 301 and the second housing 302 of FIGS. 5A to 7B.

According to various embodiments, as the first housing 301 (and the flexible display 303 connected to the first housing 301) slides in or out relative to the second housing 302, the electronic device may be in the closed state or the opened state. Hereinafter, a structure different from that of FIGS. 7A and 7B will be mainly described.

According to various embodiments, the first housing 301 may include a first conductive portion 410 and a $(1\text{-}4)^{th}$ segmented portion 430*d* extending from the first conductive portion 410, and the first conductive portion 410 may be used as a radiator of an antenna structure. According to an embodiment, the first conductive portion 410 may be a radiator having a relatively smaller length compared to the second conductive portion 420. The $(1\text{-}4)^{th}$ segmented portion 430*d* may be designed to have a larger length compared to the $(1\text{-}3)^{th}$ segmented portion 430*c* in FIGS. 13A and 13B to overlap most of the second conductive portion 420.

According to various embodiments, the second housing 302 may include a second conductive portion 420 and a second segmented portion 470, and the second conductive portion 420 may be used as a radiator of an antenna structure. According to an embodiment, the second conductive portion 420 may include a recess (not illustrated) in which at least a portion of the $(1\text{-}4)^{th}$ segmented portion 430*d* is slidable. The recess may be designed to have a size corresponding to at least a portion of the $(1\text{-}4)^{th}$ segmented portion 430*d* to guide the slide movement of the $(1\text{-}4)^{th}$ segmented portion 430*d*.

An electronic device (e.g., the electronic device 101 in FIGS. 1 to 4) according to various embodiments of the disclosure may include: a first housing (e.g., 201 in FIG. 4)

including a first conductive portion (e.g., 410 in FIG. 7A), a first non-conductive portion (e.g., 431 in FIG. 7A), and a first segmented portion (e.g., 432 in FIG. 7A) extending from the first conductive portion, a second housing (e.g., 202 in FIG. 4) configured to accommodate at least a portion of the first housing and to guide a slide movement of the first housing, the second housing including a second conductive portion (e.g., 420 in FIG. 7A), and a flexible display (e.g., 203 in FIG. 4) including a first area connected to the first housing and a second area extending from the first area and configured to be bendable or rollable. From a slide-in state to a slide-out state of the first housing with respect to the second housing, the first conductive portion and the second conductive portion may be spaced apart from each other. In the slide-in state of the first housing with respect to the second housing, at least a portion of the first non-conductive portion may overlap the second conductive portion.

According to various embodiments, the first conductive portion and the second conductive portion may be spaced apart from each other with the first segmented portion interposed therebetween.

According to various embodiments, the first segmented portion may include an air gap or an insulating material.

According to various embodiments, in the slide-out state of the first housing with respect to the second housing, at least a portion of the first non-conductive portion may overlap the second conductive portion.

According to various embodiments, the second conductive portion may include a recess (e.g., 422 in FIG. 7A) formed along an inner surface of the second conductive portion configured to guide the slide movement of the first non-conductive portion.

According to various embodiments, an end surface of the first conductive portion and an end surface of the second conductive portion may face each other with the first segmented portion interposed therebetween.

According to various embodiments, one surface (e.g., 411 in FIG. 7A) of the first conductive portion exposed to the outside and one surface (e.g., 421 in FIG. 7A) of the second conductive portion exposed to the outside may be located on the same plane.

According to various embodiments, the second conductive portion may be configured to be operable as an antenna radiator.

According to various embodiments, the first segmented portion and the non-conductive portion may be formed a stepped shape.

According to various embodiments, the first segmented portion may extend from one end of the first conductive portion in a direction perpendicular to the slide direction, and the non-conductive portion may extend from the first segmented portion in the slide direction to be movable along the recess of the second conductive portion.

According to various embodiments, a top surface (e.g., 431a in FIG. 7B) of the first segmented portion may be located on the same plane as a top surface of the first conductive portion and/or a top surface of the second conductive portion, and a bottom surface of the first segmented portion (e.g., 431b in FIG. 7B) may be configured to further extend in a lower direction than the bottom surface of the first conductive portion.

According to various embodiments, one end of the second conductive portion may face the first segmented portion, a second segmented portion (e.g., 440 in FIG. 11B) may be disposed on an other end of the second conductive portion, and the second conductive portion and the second segmented portion may include a recess formed along inner surfaces thereof to guide the slide movement of the first non-conductive portion.

According to various embodiments, the first segmented portion and the non-conductive portion may include an insulating material and may have an extending shape having a thickness corresponding to the first conductive portion.

According to various embodiments, a top surface of the second conductive portion may extend further in an upward direction with respect to the top surface of the first segmented portion and the top surface of the first conductive portion.

According to various embodiments, in the slide-in state of the first housing with respect to the second housing, a resonance characteristic formed in the second conductive portion may correspond to a resonance characteristic formed in the second conductive portion in the slide-out state of the first housing with respect to the second housing.

According to various embodiments, the electronic device may further include a main circuit board (e.g., 204 in FIG. 8A) disposed in the second housing, a first sub-board (e.g., 500a in FIG. 8A) disposed in the first housing, and a flexible connection member (e.g., 513 in FIG. 8A) configured to be deformable to electrically connect the main circuit board and the first sub-board from the slide-in state to the slide-out state.

An electronic device (e.g., the electronic device 101 in FIGS. 1 to 4) according to various embodiments of the disclosure may include: a first housing (e.g., 201 in FIG. 4) including a first conductive portion (e.g., 410 in FIG. 7A), a first non-conductive portion (e.g., 432 in FIG. 7A), and a first segmented portion (e.g., 431 in FIG. 7A) extending from the first conductive portion, a second housing (e.g., 202 in FIG. 4) configured to receive at least a portion of the first housing, guide a slide movement of the first housing, and including a second conductive portion (e.g., 420 in FIG. 7A), and a flexible display (e.g., 203 in FIG. 4) including a first area connected to the first housing and a second area extending from the first area and configured to be bendable or rollable. From a slide-in state to a slide-out state of the first housing with respect to the second housing, the first conductive portion and the second conductive portion may be spaced apart from each other with the first segmented portion interposed therebetween.

According to various embodiments, in the slide-in state of the first housing with respect to the second housing, at least a portion of the first non-conductive portion may overlap the second conductive portion.

According to various embodiment, in the slide-out state of the first housing with respect to the second housing, at least a portion of the first non-conductive portion may overlap the second conductive portion.

According to various embodiment, the second conductive portion may include a recess formed along an inner surface thereof configured to guide the slide movement of the first non-conductive portion.

According to various embodiments, an end surface of the first conductive portion and an end surface of the second conductive portion may face each other with the first segmented portion interposed therebetween.

While the disclosure has been illustrated and described with reference to various embodiments, it will be understood that the various embodiments are intended to be illustrative, not limiting. It will be further understood by those skilled in the art that various changes, substitutions and modifications may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing including a first conductive portion, a first non-conductive portion, and a first segmented portion extending from the first conductive portion;
a second housing configured to accommodate at least a portion of the first housing and to guide a slide movement of the first housing, the second housing including a second conductive portion; and
a flexible display including a first area connected to the first housing and a second area extending from the first area and configured to be bendable or rollable,
wherein, from a slide-in state to a slide-out state of the first housing with respect to the second housing, the first conductive portion and the second conductive portion are spaced apart from each other, and
in the slide-in state of the first housing with respect to the second housing, at least a portion of the first non-conductive portion overlaps the second conductive portion.

2. The electronic device of claim 1, wherein the first conductive portion and the second conductive portion are spaced apart from each other with the first segmented portion therebetween.

3. The electronic device of claim 1, wherein the first segmented portion includes an air gap or an insulating material.

4. The electronic device of claim 1, wherein, in the slide-out state of the first housing with respect to the second housing, at least a portion of the first non-conductive portion overlaps the second conductive portion.

5. The electronic device of claim 1, wherein the second conductive portion includes a recess formed along an inner surface thereof configured to guide the slide movement of the first non-conductive portion.

6. The electronic device of claim 1, wherein an end surface of the first conductive portion and an end surface of the second conductive portion face each other with the first segmented portion therebetween.

7. The electronic device of claim 1, wherein one surface of the first conductive portion exposed to an outside and one surface of the second conductive portion exposed to the outside are disposed on a same plane.

8. The electronic device of claim 1, wherein the second conductive portion is configured to operate as an antenna radiator.

9. The electronic device of claim 1, wherein the first segmented portion and the first non-conductive portion are formed having a stepped shape.

10. The electronic device of claim 9, wherein the first segmented portion extends from one end of the first conductive portion in a direction perpendicular to the slide direction, and the first non-conductive portion extends from the first segmented portion in the slide direction to be movable along the recess of the second conductive portion.

11. The electronic device of claim 10, wherein a top surface of the first segmented portion is located on a same plane as a top surface of the first conductive portion and/or a top surface of the second conductive portion, and a bottom surface of the first segmented portion further extends in a lower direction than a bottom surface of the first conductive portion.

12. The electronic device of claim 1, wherein one end of the second conductive portion faces the first segmented portion, and a second segmented portion is disposed at another end of the second conductive portion, and
the second conductive portion and the second segmented portion include a recess formed along inner surfaces thereof configured to guide the slide movement of the first non-conductive portion.

13. The electronic device of claim 1, wherein the first segmented portion and the first non-conductive portion include an insulating material and have an extending shape having a thickness corresponding to the first conductive portion.

14. The electronic device of claim 13, wherein a top surface of the second conductive portion extends further in an upward direction with respect to a top surface of the first segmented portion and a top surface of the first conductive portion.

15. The electronic device of claim 1, wherein, in the slide-in state of the first housing with respect to the second housing, a resonance characteristic in the second conductive portion corresponds to a resonance characteristic formed in the second conductive portion in the slide-out state of the first housing with respect to the second housing.

16. The electronic device of claim 1, further comprising:
a main circuit board disposed in the second housing;
a first sub-board disposed in the first housing; and
a flexible connection member configured to be deformable to electrically connect the main circuit board and the first sub-board from the slide-in state to the slide-out state.

17. An electronic device comprising:
a first housing including a first conductive portion, a first non-conductive portion, and a first segmented portion extending from the first conductive portion;
a second housing configured to accommodate at least a portion of the first housing and to guide a slide movement of the first housing, the second housing including a second conductive portion; and
a flexible display including a first area connected to the first housing and a second area extending from the first area and configured to be bendable or rollable,
wherein from a slide-in state to a slide-out state of the first housing with respect to the second housing, the first conductive portion and the second conductive portion are spaced apart from each other with the first segmented portion therebetween.

18. The electronic device of claim 17, wherein, in the slide-in state of the first housing with respect to the second housing, at least a portion of the first non-conductive portion overlaps the second conductive portion.

19. The electronic device of claim 18, wherein, in the slide-out state of the first housing with respect to the second housing, at least a portion of the first non-conductive portion overlaps the second conductive portion.

20. The electronic device of claim 17, wherein the second conductive portion includes a recess formed along an inner surface thereof configured to guide the slide movement of the first non-conductive portion.

* * * * *